US012792229B2

(12) United States Patent
Lee

(10) Patent No.: US 12,792,229 B2
(45) Date of Patent: Nov. 10, 2026

(54) STORAGE DEVICE AND DATA CENTER INCLUDING THE SAME

(71) Applicant: Samsung Electronics Co., Ltd., Suwon-si (KR)

(72) Inventor: Seunghan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 19/010,336

(22) Filed: Jan. 6, 2025

(65) Prior Publication Data

US 2026/0044265 A1 Feb. 12, 2026

(30) Foreign Application Priority Data

Aug. 8, 2024 (KR) ........................ 10-2024-0105833

(51) Int. Cl.
*G06F 1/30* (2006.01)
*G06F 3/06* (2006.01)

(52) U.S. Cl.
CPC .............. *G06F 3/0619* (2013.01); *G06F 1/30* (2013.01); *G06F 3/0659* (2013.01); *G06F 3/067* (2013.01)

(58) Field of Classification Search
CPC .................................... G06F 1/30; G11C 5/14
USPC ........................................................... 365/52
See application file for complete search history.

(56) References Cited

U.S. PATENT DOCUMENTS 9,286,985 B2 3/2016 Kimura
9,568,971 B2 2/2017 Meir et al.
9,575,663 B2 2/2017 Shim
10,649,894 B2 * 5/2020 Lee ..................... G06F 12/0246
11,550,496 B2 1/2023 Cheong
11,561,739 B1 * 1/2023 Marino ..................... G06F 1/30
11,640,251 B2 5/2023 Benisty et al.
2020/0393504 A1 12/2020 Abrahams et al.
2021/0165581 A1 * 6/2021 Kwon ....................... G06F 1/04

* cited by examiner

*Primary Examiner* — Anthan Tran
(74) *Attorney, Agent, or Firm* — Fish & Richardson P.C.

(57) ABSTRACT

A storage device includes at least one nonvolatile memory device, a volatile memory device, a storage controller, an auxiliary power supply and a power loss protection (PLP) integrated circuit (IC). The PLP IC provides one of an internal power supply voltage or an external power supply voltage. The storage controller enters the storage device into an idle state in response to the storage controller not receiving a new request from a host during a first time interval and performs a background flush operation to move a first data temporarily stored in the volatile memory device to the nonvolatile memory device in response to a second time interval elapsing from the storage device entering into the idle state. In the idle state, the PLP IC provides the internal power supply voltage to the volatile memory device and the volatile memory device performs a self-refresh operation using the internal power supply voltage.

20 Claims, 22 Drawing Sheets

500

400a

STORAGE DEVICE AND DATA CENTER INCLUDING THE SAME

CROSS-REFERENCE TO RELATED APPLICATION(S)

This US non-provisional application claims priority under 35 USC § 119 to Korean Patent Application No. 10-2024-0105833, filed on Aug. 8, 2024, in the Korean Intellectual Property Office (KIPO), the disclosure of which is incorporated herein by reference in its entirety.

BACKGROUND

1. Technical Field

Example embodiments generally relate to semiconductor integrated circuits, and more to storage devices and data centers including the same.

2. Discussion of the Related Art

One or more semiconductor memory devices may be used in data storage devices. Examples of such data storage devices include solid state drives (SSDs). SSDs typically use flash memory and function as secondary storage. SSDs may have various design and/or performance advantages over hard disk drives (HDDs). Examples include the absence of moving mechanical parts, higher data access speeds, stability, durability, and/or low power consumption. Various systems, e.g., one or more of a laptop computer, a car, an airplane, a drone, etc., have adopted SSDs for data storage.

When storage systems including storage devices are to be applied to storage servers, the performance and cost of the storage servers may have a trade-off relationship. In addition, power consumption of the storage servers in idle state may be associated with operating cost of the storage servers.

SUMMARY

Some example embodiments may provide storage devices capable of reducing power consumption in an idle state.

Some example embodiments may provide data centers including a storage device capable of reducing power consumption in an idle state.

According to some example embodiments, a storage device includes at least one nonvolatile memory device, a volatile memory device, a storage controller, an auxiliary power supply and a power loss protection (PLP) integrated circuit (IC). The storage controller configured to control the at least one nonvolatile memory device and the volatile memory device. The PLP IC configured to generate the charging voltage based on an external power supply voltage and provide one of the internal power supply voltage or the external power supply voltage to the storage controller, the at least one nonvolatile memory device, and the volatile memory device as an output voltage. The storage controller enters the storage device into an idle state in response to the storage controller not receiving a new request from an external host during a first time interval after the storage controller completes an operation based on a first request received from the external host and performs a background flush operation to move a first data temporarily stored in the volatile memory device to the at least one nonvolatile memory device in response to a second time interval elapsing from a time point the storage device entered into the idle state. In the idle state, the PLP IC is configured to provide the internal power supply voltage to the volatile memory device. Based on the background flush operation being completed, the volatile memory device is configured to perform a self-refresh operation using the internal power supply voltage in the idle state.

According to some example embodiments, a data center includes a plurality of application servers and a plurality of storage servers. The plurality of application servers configured to receive a data write request and receive a data read request. The plurality of storage servers configured to store write data corresponding to the data write request and output read data corresponding to the data read request. A first storage server among the plurality of storage servers includes a storage device, a compute express link (CXL) memory expander, and a power loss protection (PLP) capacitor. The storage device includes at least one nonvolatile memory device and a storage controller configured to control the at least one nonvolatile memory device. The CXL memory expander is electrically connected to the storage device, and configured to communicate through a CXL interface and operate as a buffer memory of the storage device by including a volatile memory device. The PLP capacitor is electrically connected to the storage device and the CXL memory expander and is outside the storage device. The first PLP capacitor configured to supply an auxiliary power voltage to the storage device and the CXL memory expander in an idle state in which the storage device does not receive a request from an outside during a first time interval. The storage controller performs a background flush operation to move a first data temporarily stored in the volatile memory device to the at least one nonvolatile memory device in response to a second time interval elapsing from a time point the storage device entered into the idle state. Based on the background flush operation being completed, the volatile memory device configured to perform a self-refresh operation using the auxiliary power supply voltage in the idle state.

According to some example embodiments, a storage device includes at least one nonvolatile memory device, a volatile memory device, a storage controller, an auxiliary power supply and a power loss protection (PLP) integrated circuit (IC). The storage controller configured to control the at least one nonvolatile memory device and the volatile memory device. The PLP IC configured to generate the charging voltage based on an external power supply voltage and provide one of the internal power supply voltage or the external power supply voltage to the storage controller, the at least one nonvolatile memory device, and the volatile memory device as an output voltage. The storage controller configured to enter the storage device into an idle state in response to the storage controller not receiving a new request from an external host during a first time interval after the storage controller completes an operation based on a first request received from the external host and perform a background flush operation to move a first data temporarily stored in the volatile memory device to the at least one nonvolatile memory device in response to a second time interval elapsing from a time point the storage device entered into the idle state. In the idle state, the PLP IC is configured to provide the internal power supply voltage to the volatile memory device. Based on the background flush operation being completed, the volatile memory device is configured to perform a self-refresh operation using the internal power supply voltage in the idle state. The PLP IC includes a plurality of capacitors connected in parallel with respect to each other.

Therefore, in the storage device including the volatile memory device operating as a buffer memory and the data center including the storage device, the auxiliary power supply is charged based on an external power supply voltage in a normal state and the volatile memory device performs a self-refresh operation on memory cells therein by using a voltage charged in the auxiliary power supply. Accordingly, the storage device may reduce power consumption in the idle state, because the storage device does not use the external power supply voltage in the idle state. For example, according to some example embodiments, there may be an increase in reliability, operating parameters (e.g., temperature), speed, accuracy, and/or power efficiency of the storage device based on the above methods. Therefore, the improved devices and methods overcome the deficiencies of the conventional devices and methods while reducing resource consumption, and/or improving data accuracy, operating parameters, and resource allocation (e.g., latency). Further, there is an improvement in user experience in the device by providing the improved process, for example, by reducing management responsibilities.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Various example embodiments will be described more fully hereinafter with reference to the accompanying drawings, in which some example embodiments are shown.

Figure 1:
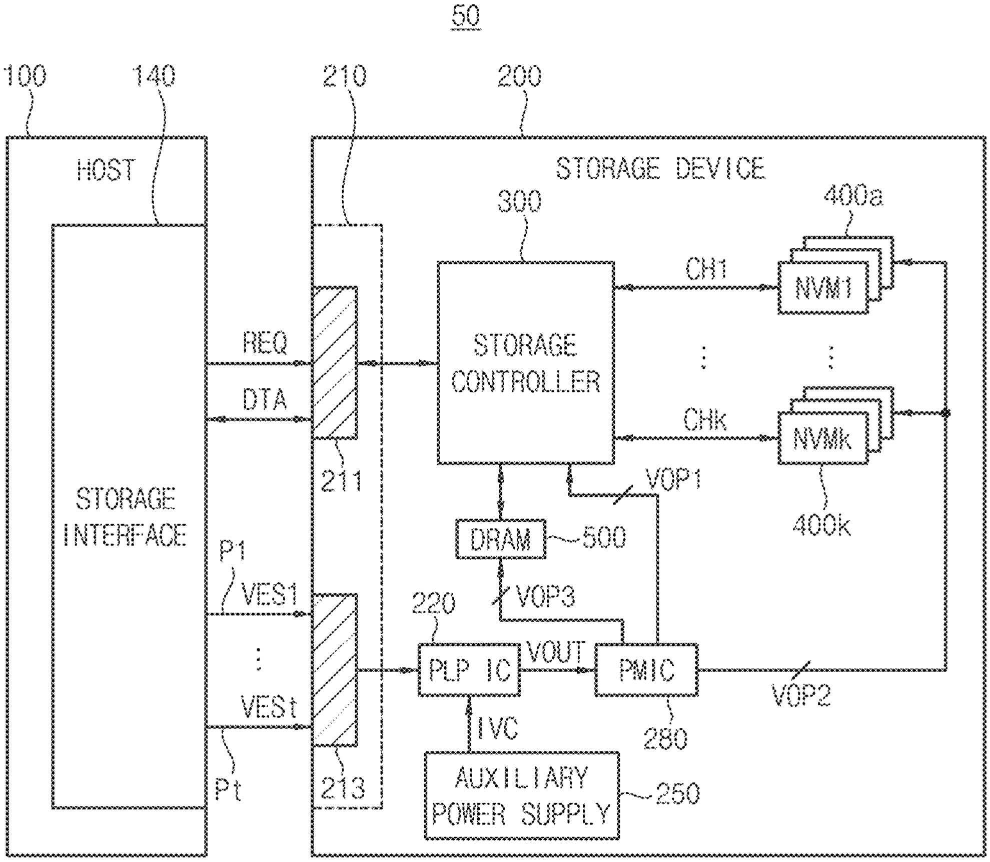
FIG. 1 is a block diagram illustrating a storage system according to some example embodiments.

FIG. 1 is a block diagram illustrating a storage system according to some example embodiments.

Referring to FIG. 1, a storage system 50 may include a host 100 and a storage device 200. The host 100 may include a storage interface 140.

The storage device 200 may be any kind of storage devices.

The storage device 200 may include a storage controller 300, a plurality of nonvolatile memory devices (NVM1~NVMk) 400*a*~400*k* (where k is an integer greater than two), a power loss protection (PLP) integrated circuit (IC) 220, an auxiliary power supply 250, a power management integrated circuit (PMIC) 280, and a connector 210. The connector 210 may include a signal connector 211 and a power connector 213. The storage device 200 may further include a dynamic random access memory DRAM device 500. The DRAM device 500 may be referred to as a volatile memory device hereinafter.

In some example embodiments, the storage system 50 may be one of various computing devices such as a personal computer (PC), a server computer, a data center, a workstation, a digital television (TV), a set-top box, etc. In some example embodiments, the storage system 50 may be one of various mobile devices such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The plurality of nonvolatile memory devices 400*a*~400*k* may be used as a storage medium of the storage device 200. In some example embodiments, each of the plurality of nonvolatile memory devices 400*a*~400*k* may include a flash memory or a vertical NAND memory device. The storage controller 300 may be coupled to the plurality of nonvolatile memory devices 400*a*~400*k* through a plurality of channels CH1~CHk, respectively.

The storage controller 300 may be configured to receive a request REQ from the host 100 and communicate data DTA with the host 100 through the signal connector 211. The storage controller 300 may write data DTA to the plurality of nonvolatile memory devices 400*a*~400*k* and/or read the data DTA from plurality of nonvolatile memory devices 400*a*~400*k* based on the request REQ.

The storage controller 300 may communicate the data DTA with the host 100 using the volatile memory device 500 as an input/output buffer.

The PLP IC 220 may be configured to receive a plurality of power supply voltages (e.g., external supply voltages) VES1-VESt from the host 100 through the power connector 213. For example, the power connector 213 may include a plurality of power lines P1~Pt, and the PLP IC 220 may be configured to receive the plurality of power supply voltages VES1~VESt from the host 100 through the plurality of power lines P~Pt, respectively. Here, t represents a positive integer greater than one.

The auxiliary power supply 250 may charge a plurality of capacitors therein using at least one of the plurality of power supply voltages VES1~VESt as a charging voltage, may generate an internal power supply voltage IVC and may provide the internal power supply voltage IVC to the PLP IC 220.

The PLP IC 220 may receive the internal power supply voltage IVC from the auxiliary power supply 250. The PLP IC 220 may provide the PMIC 280 with at least one of the plurality of power supply voltages VES1~VESt or the internal power supply voltage IVC as an output voltage VOUT.

The PLP IC 220 may provide the PMIC 280 with at least one of the plurality of power supply voltages VES1~VESt as the output voltage VOUT in a normal state in which the storage controller 300 receives the request REQ from the host 100. The PLP IC 220 may provide the PMIC 280 with the internal power supply voltage IVC as the output voltage VOUT in a sudden power off (SPO) situation or in an idle state in which the storage controller 300 does not receive the request REQ from the host 100 during a first time interval. In the SPO situation, the plurality of power supply voltages VES1~VESt supplied to the storage device 200 may be suddenly cut off. The storage controller 300 may enter the storage device 200 into the idle state when the storage controller 300 does not receive a new request from the host 100 during a first time interval after the storage controller 300 completes an operation based on a first request received from the host 100.

The PMIC 280 may generate at least one first operating voltage VOP1 used by the storage controller 300, at least one second operating voltage VOP2 used by the plurality of nonvolatile memory devices 400*a*~400*k*, and at least one third operating voltage VOP3 used by the volatile memory device 500 based on the output voltage VOUT.

The volatile memory device 500 may perform a self-refresh operation on memory cells therein based on the internal power supply voltage IVC in the idle state.

Figure 2:
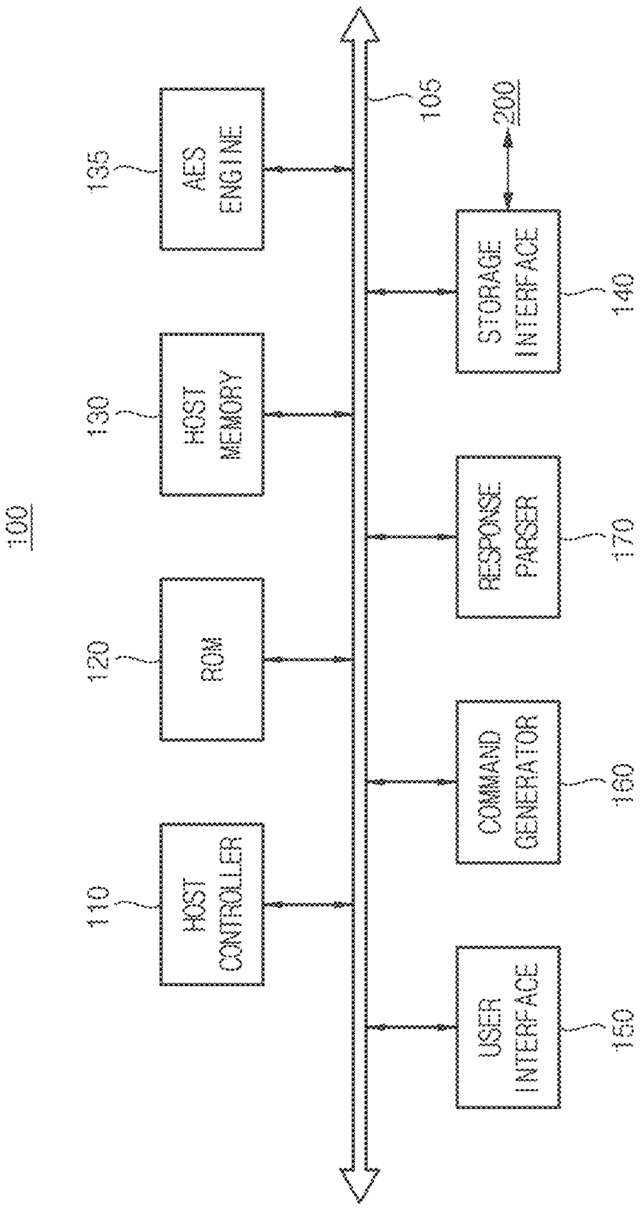
FIG. 2 is a block diagram illustrating an example of the host in FIG. 1 according to some example embodiments.

FIG. 2 is a block diagram illustrating an example of the host in FIG. 1 according to some example embodiments.

Referring to FIG. 2, the host 100 may include a host controller 110, a read-only memory (ROM) 120, a host memory 130, an advanced encryption standard (AES) engine 135, the storage interface 140, a user interface 150, a command generator 160, a response parser 170, and a bus 105.

The bus 105 may refer to a transmission channel via which data is transmitted between the host controller 110, the ROM 120, the host memory 130, the AES engine 135, the storage interface 140, the user interface 150, the command generator 160, and the response parser 170 of the host 100.

The ROM 120 may store various application programs. For example, application programs supporting storage protocols such as Advanced Technology Attachment (ATA), Small Computer System Interface (SCSI), embedded Multi Media Card (eMMC), and/or Universal flash storage (UFS) protocols are stored.

The host memory 130 may temporarily store data and/or programs. The host memory 130 may include a submission queue and a completion queue. The user interface 150 may be a physical or virtual medium for exchanging information between a user and the host device 100, a computer program, etc., and includes physical hardware and logical software. For example, the user interface 150 may include an input device for allowing the user to manipulate the host 100, and an output device for outputting a result of processing an input of the user.

The host controller 110 may control overall operations of the host 100. The host controller 110 may generate a command for storing data in the storage device 200 and/or a request (or a command) for reading data from the storage device 200 by using an application stored in the ROM 120, and may transmit the request to the storage device 200 via the storage interface 140. The host controller 110 may generate plurality of power supply voltages VES1~VESt.

The AES engine 135 may perform an encryption operation on data provided from the storage device 200 and may perform a decryption operation on data received from the storage device by using a symmetric-key algorithm.

The command generator 160 may generate a command designating an operation to be performed in the storage device 200. The command, generated by the command generator 160, may be transmitted to the storage device 200 through the storage interface 140.

The command generator 160 may generate various kinds of commands such as a read command, a write command and an erase command. The read command may designate an operation of reading data stored in the storage device 200. The write command may designate an operation of writing data in the storage device 200. The erase command may designate an operation of physically erasing data stored in the storage device 200.

The response parser 170 may analyze a response received from the storage device 200.

Figure 3:
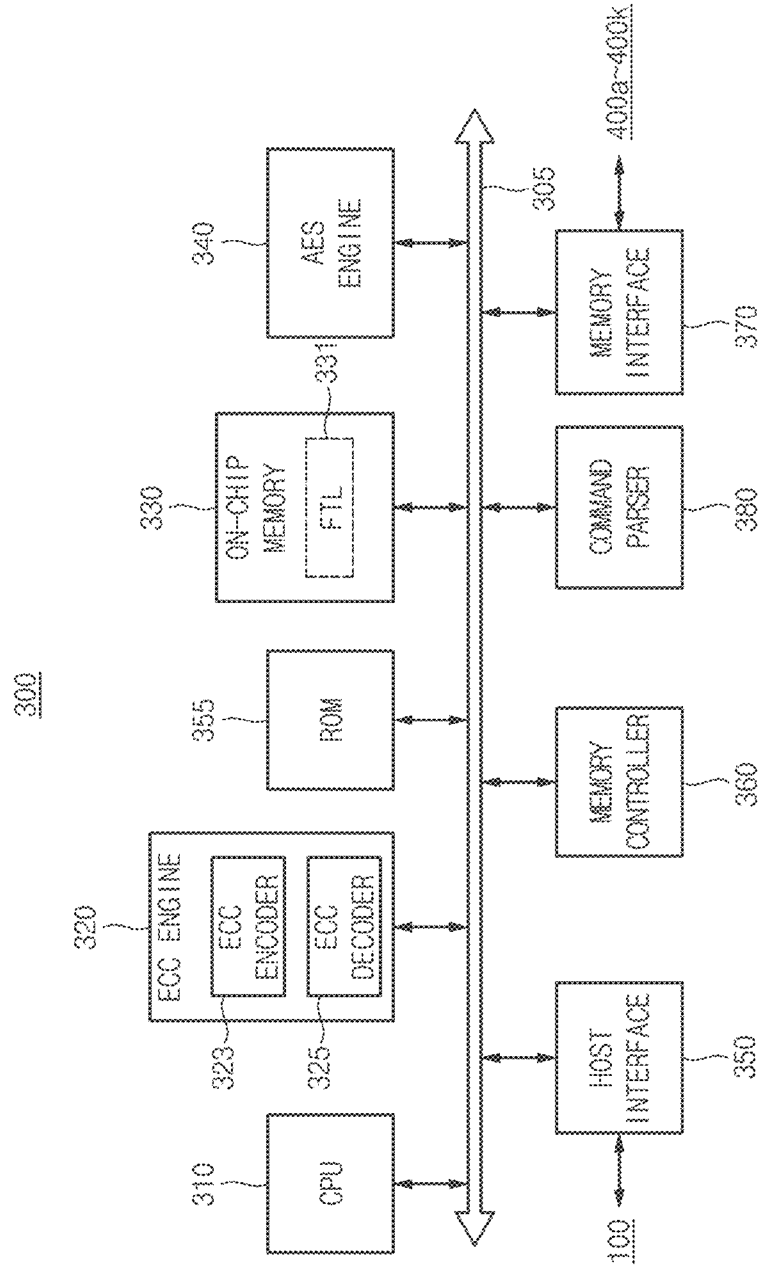
FIG. 3 is a block diagram illustrating an example of the storage controller in the storage device in FIG. 1 according to some example embodiments.

FIG. 3 is a block diagram illustrating an example of the storage controller in the storage device in FIG. 1 according to some example embodiments.

Referring to FIG. 3, the storage controller 300 may include a central processing unit (CPU) 310, an error correction code (ECC) engine 320, an on-chip memory 330, an AES engine 340, a host interface 350, a ROM 355, a memory controller 360, an ECC engine 365, a command parser 380, and a memory interface 370 which are connected via a bus 305.

The CPU 310 may control an overall operation of the storage controller 300. The CPU 310 may control the ECC engine 320, the on-chip memory 330, the AES engine 340, the host interface 350, the ROM 355, the memory controller 360, the ECC engine 365, the command manager 380, and the memory interface 370.

The CPU 310 may include one or more cores (e.g., a homogeneous multi-core or a heterogeneous multi-core). The CPU 310 may be or include, for example, at least one of an image signal processing unit (ISP), a digital signal processing unit (DSP), a graphics processing unit (GPU), a vision processing unit (VPU), and a neural processing unit (NPU). The CPU 310 may execute various application programs (e.g., a flash translation layer (FTL) 331 and firmware) loaded onto the on-chip memory 330.

The on-chip memory 330 may store various application programs that are executable by the CPU 310. The on-chip memory 330 may operate as a cache memory adjacent to the CPU 310. The on-chip memory 330 may store a command, an address, and data to be processed by the CPU 310 or may store a processing result of the CPU 310. The on-chip memory 330 may be, for example, a storage medium or a working memory including a latch, a register, a static random access memory (SRAM), a dynamic random access memory (DRAM), a thyristor random access memory (TRAM), a tightly coupled memory (TCM), etc.

The CPU 310 may execute the FTL 331 loaded onto the on-chip memory 330. The FTL 331 may be loaded onto the on-chip memory 330 as firmware or a program stored in the one of the nonvolatile memory devices 400*a*~400*k*. The FTL 331 may manage mapping between a logical address provided from the host 100 and a physical address of the nonvolatile memory devices 400*a*~400*k* and may include an address mapping table manager managing and updating an address mapping table. The FTL 331 may further perform a garbage collection operation, a wear leveling operation, and the like, as well as the address mapping described above. The FTL 331 may be executed by the CPU 310 for addressing one or more of the following aspects of the nonvolatile memory devices 400*a*~400*k*: overwrite- or in-place write-impossible, a life time of a memory cell, a limited number of program-erase (PE) cycles, and an erase speed slower than a write speed.

Memory cells of the nonvolatile memory devices 400*a*~400*k* may have the physical characteristic that a threshold voltage distribution varies due to causes, such as a program elapsed time, a temperature, program disturbance, read disturbance, etc. For example, data stored at the nonvolatile memory devices 400*a*~400*k* becomes erroneous due to the above causes.

The storage controller 300 may utilize a variety of error correction techniques to correct such errors. For example, the storage controller 300 may include the ECC engine 320. The ECC engine 320 may correct errors which occur in the data stored in the nonvolatile memory devices 400*a*~400*k*. The ECC engine 320 may include an ECC encoder 323 and an ECC decoder 325. The ECC encoder 323 may perform an ECC encoding operation on data to be stored in the nonvolatile memory devices 400*a*~400*k*. The ECC decoder 325 may perform an ECC decoding operation on data read from the nonvolatile memory devices 400*a*~400*k*.

The ROM 355 may store a variety of information, for example, desired or beneficial for the storage controller 300 to operate, in firmware.

The AES engine 340 may perform at least one of an encryption operation and a decryption operation on data input to the storage controller 300 by using a symmetric-key algorithm. Although not illustrated in detail, the AES engine 340 may include an encryption module and a decryption module. For example, the encryption module and the decryption module may be implemented as separate modules. For another example, one module capable of performing both encryption and decryption operations may be implemented in the AES engine 340.

The command parser 380 may analyze the command received from the host 100.

The memory controller 360 may perform access operation on the volatile memory device 500.

The storage controller 300 may communicate with the host 100 through the host interface 350. For example, the host interface 350 may include Universal Serial Bus (USB), Multimedia Card (MMC), embedded-MMC, peripheral component interconnection (PCI), PCI-express, Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), Nonvolatile memory express (NVMe), Universal Flash Storage (UFS), etc. The storage controller 300 may communicate with the nonvolatile memory devices 400*a*~400*k* through the memory interface 370.

Figure 4:
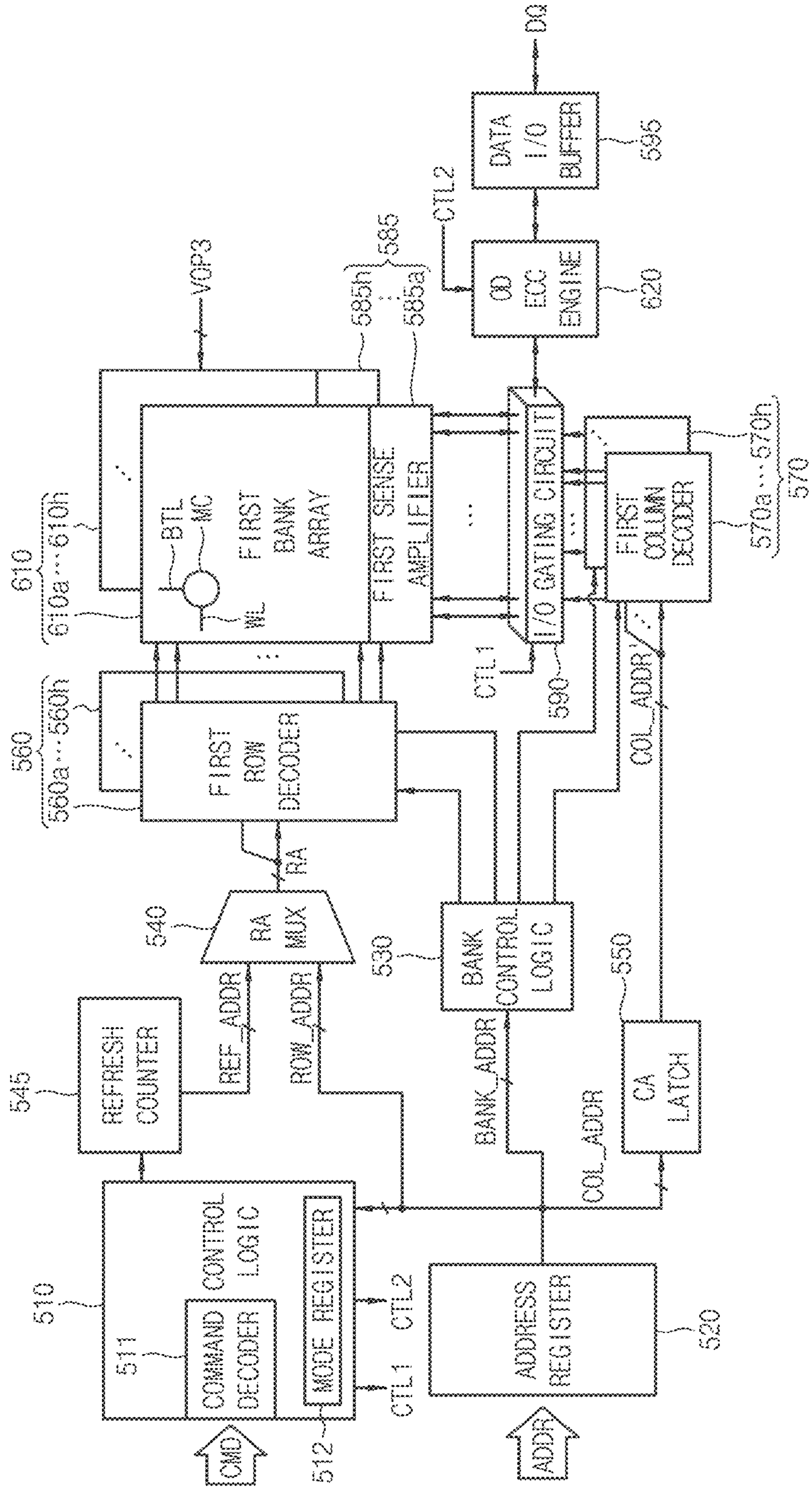
FIG. 4 is a block diagram illustrating an example of the volatile memory device in the storage device in FIG. 1 according to some example embodiments.

FIG. 4 is a block diagram illustrating an example of the volatile memory device in the storage device in FIG. 1 according to some example embodiments.

Referring to FIG. 4, the volatile memory device 500 may include a control logic circuit 510, an address register 520, a bank control logic circuit 530, a row address multiplexer 540, a column address CA latch 550, a row decoder 560, a column decoder 570, a memory cell array 610, a sense amplifier unit 585, an input/output (I/O) gating circuit 590, a refresh counter 545, an on-die OD ECC engine 620, and a data input/output (I/O) buffer 595.

In some example embodiments, the on-die ECC engine 620 may not be included in the volatile memory device 500.

The memory cell array 610 may include first through eighth bank arrays 610*a*~610*h*.

The row decoder 560 may include first through eighth row decoders 560*a*~560*h* coupled to the first through eighth bank arrays 610*a*~610*h*, respectively, the column decoder 570 may include first through eighth column decoders 570*a*~570*h* coupled to the first through eighth bank arrays 610*a*~610*h*, respectively, and the sense amplifier unit 585 may include first through eighth sense amplifiers 585*a*~585*h* coupled to the first through eighth bank arrays 610*a*~610*h*, respectively.

The first through eighth bank arrays 610*a*~610*h*, the first through eighth row decoders 560*a*~560*h*, the first through eighth column decoders 570*a*~570*h*, and the first through eighth sense amplifiers 585*a*~585*h* may form first through eighth banks. Each of the first through eighth bank arrays may include a plurality of word-lines WL, a plurality of bit-lines BTL, and a plurality of memory cells MC formed at intersections of the word-lines WL and the bit-lines BTL.

The third operating voltage VOP3 may be provided to the memory cell array 610. In the idle state, the internal power supply voltage IVC may be provided as the third operating voltage VOP3 and the self-refresh operation using the internal power supply voltage IVC may be performed on the memory cells MC in the memory cell array 610 in the idle state.

Although the volatile memory device 500 is illustrated in FIG. 4 as including eight banks, the volatile memory device 500 may include any number of banks.

The address register 520 may receive the address ADDR including a bank address BANK_ADDR, a row address ROW_ADDR, and a column address COL_ADDR from the memory controller 360. The address register 520 may provide the received bank address BANK_ADDR to the bank control logic 530, may provide the received row address ROW_ADDR to the row address multiplexer 540, and may provide the received column address COL_ADDR to the column address latch 550.

The bank control logic 530 may generate bank control signals in response to the bank address BANK_ADDR. One of the first through eighth row decoders 560*a*~560*h* corresponding to the bank address BANK_ADDR may be activated in response to the bank control signals, and one of the first through eighth column decoders 570*a*~570*h* corresponding to the bank address BANK_ADDR may be activated in response to the bank control signals.

The row address multiplexer 540 may receive the row address ROW_ADDR from the address register 520, and may receive a refresh row address REF_ADDR from the refresh counter 545. The row address multiplexer 540 may selectively output the row address ROW_ADDR or the refresh row address REF_ADDR as a row address RA. The row address RA that is output from the row address multiplexer 540 may be applied to the first through eighth row decoders 560*a*~560*h*.

The activated one of the first through eighth row decoders 560*a*~560*h* may decode the row address RA that is output from the row address multiplexer 540, and may activate a word-line WL corresponding to the row address RA. For example, the activated row decoder may generate a word-line driving voltage and may apply the word-line driving voltage to the word-line WL corresponding to the row address RA.

The column address latch 550 may receive the column address COL_ADDR from the address register 520, and may temporarily store the received column address COL_ADDR. In some example embodiments, in a burst mode, the column address latch 550 may generate column addresses COL_ADDR' that increments from the received column address COL_ADDR. The column address latch 550 may apply the temporarily stored and/or generated column address COL_ADDR' to the first through eighth column decoders 570*a*~570*h*.

The activated one of the first through eighth column decoders 570*a*~570*h* may decode the column address COL_ADDR' that is output from the column address latch 550, and may control the I/O gating circuit 590 to output data corresponding to the column address COL_ADDR'.

The I/O gating circuit 590 may include circuitry for gating input/output data. The I/O gating circuit 590 may further include read data latches for storing data that is output from the first through eighth bank arrays 610*a*~610*h*, and write control devices for writing data to the first through eighth bank arrays 610*a*~610*h*.

Codeword read from one of the first through eighth bank arrays 610*a*~610*h* may be sensed by a sense amplifier coupled to the one bank array from which the data is to be read, and may be stored in the read data latches.

The codeword stored in the read data latches may be provided to the on-die ECC engine 620. The on-die ECC engine 620 may perform an ECC decoding on the codeword to generate data and provide the data to the data I/O buffer 595. The data I/O buffer 595 may provide the data DQ to the memory controller 360.

The data DQ to be written in one of the first through eighth bank arrays 610*a*~610*h* may be provided to the data I/O buffer 595 from the memory controller 360. The data I/O buffer 595 may provide the data to the on-die ECC engine 620, and the on-die ECC engine 620 may generate parity bits based on the data and may provide the I/O gating circuit 590 with a codeword including the data and the parity bits. The I/O gating circuit 590 may write the codeword in a sub-page of the bank array through the write drivers.

The on-die ECC engine 620, in a write operation, may generate the parity bits by performing an ECC encoding on the data DQ from the data I/O buffer 595 and may store the codeword including the data DQ and the parity bits in a target page of the memory cell array 610.

The on-die ECC engine 620, in a read operation, may read the codeword including the data and the parity bits from the target page, may correct at least one error bit in the data by performing an ECC decoding on the data based on the parity bits and may output a corrected data to the data I/O buffer 595, when at least one error bit is detected in the data.

The control logic circuit 510 may control operations of the volatile memory device 500. For example, the control logic circuit 510 may generate control signals for the volatile memory device 500 to perform the write operation or the read operation. The control logic circuit 510 may include a command decoder 511 that decodes the command CMD received from the memory controller 360 and a mode register 512 that sets an operation mode of the volatile memory device 500.

For example, the command decoder 511 may generate the control signals corresponding to the command CMD by decoding a write enable signal, a row address strobe signal, a column address strobe signal, a chip select signal, etc.

The control logic circuit 510 may generate a first control signal CTL1 to control the I/O gating circuit 590 and a second control signal CTL2 to control the on-die ECC engine 620 by decoding the command CMD.

When the on-die ECC engine 620 is not included in the volatile memory device 500, the control logic circuit 510 may generate the first control signal CTL1 to control the I/O gating circuit 590 by decoding the command CMD.

Figure 5:
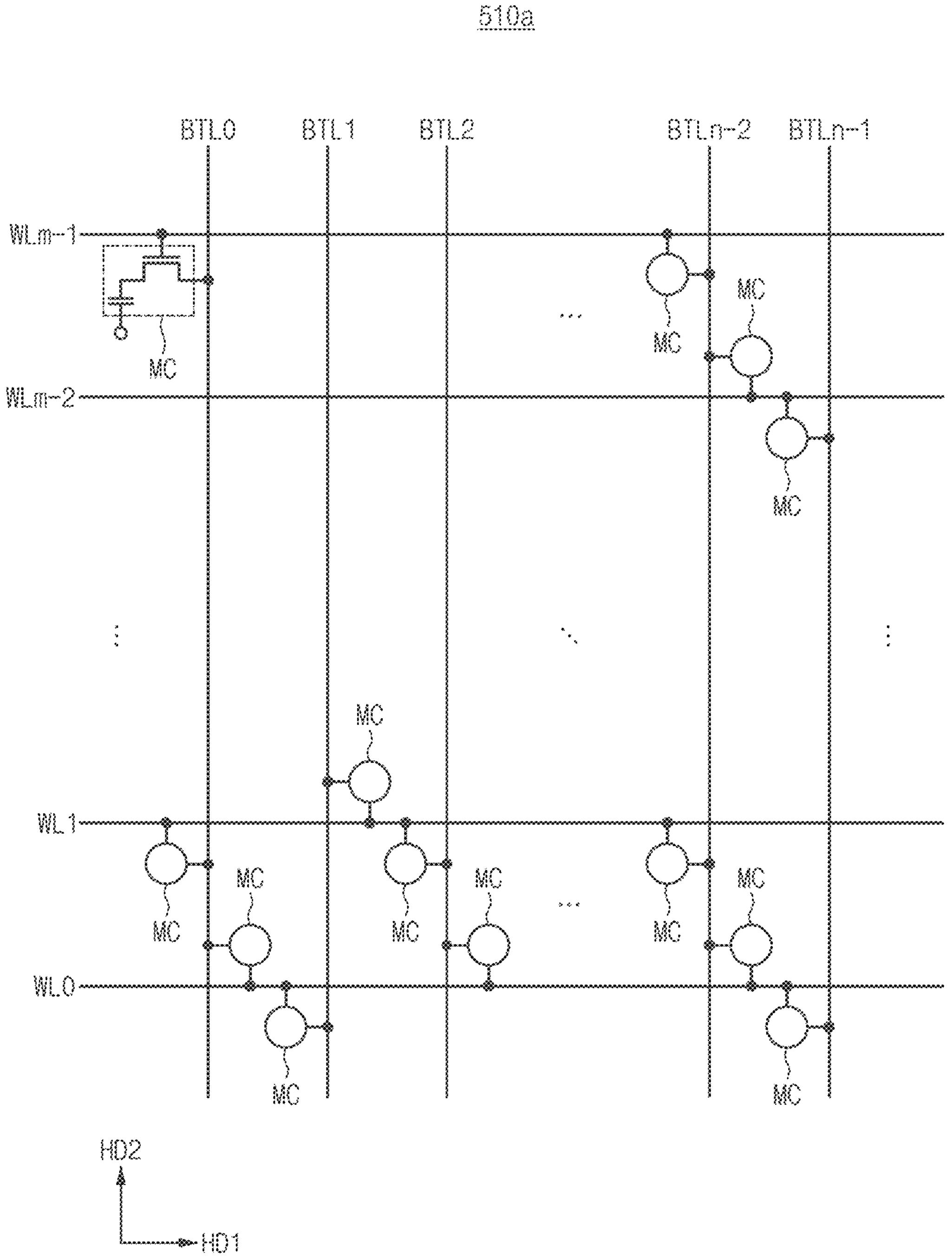
FIG. 5 illustrates an example of the first bank array in the volatile memory device of FIG. 4 according to some example embodiments.

FIG. 5 illustrates an example of the first bank array in the volatile memory device of FIG. 4 according to some example embodiments.

Referring to FIG. 5, the first bank array 610*a* may include a plurality of word-lines WL~WLm−1 (where m is an even number equal to or greater than two), a plurality of bit-lines BTL0~BTLn−1 (where n is an even number equal to or greater than two), and a plurality of memory cells MCs disposed at intersections between the word-lines WL0~WLm−1 and the bit-lines BTL0~BTLn−1.

The word-lines WL~WLm−1 may extend in a first direction (e.g., a first horizontal direction) HD1 and the bit-lines BTL0~BTLn−1 may extend in a second direction (e.g., a second horizontal direction) HD2.

Each of the memory cells MCs includes an access (cell) transistor coupled to one of the word-lines WL0~WLm−1 and one of the bit-lines BTL0~BTLn−1 and a storage (cell) capacitor coupled to the cell transistor. That is, each of the memory cells MCs has a DRAM cell structure.

In addition, the memory cells MCs may have different arrangement depending on that the memory cells MCs are coupled to an even word-line (for example, WL0) or an odd word-line (for example, WL1). That is, a bit-line coupled to adjacent memory cells may be different depending on whether a word-line selected by an access address is an even word-line or an odd word-line.

Figure 6:
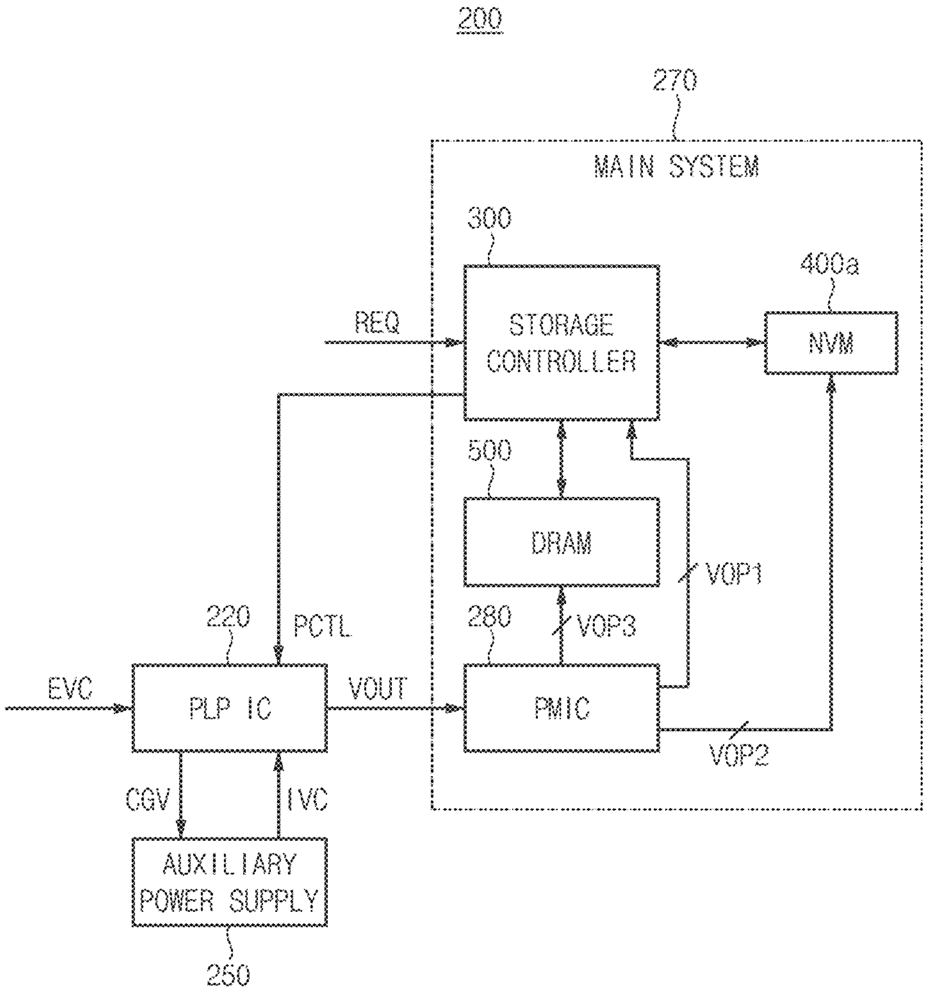
FIG. 6 is a block diagram illustrating a storage device in FIG. 1 according to some example embodiments.

FIG. 6 is a block diagram illustrating a storage device in FIG. 1 according to some example embodiments.

Referring to FIG. 6, the storage device 200 may include a PLP IC 220, auxiliary power supply 250, and a main system 270. The main system 270 may include a PMIC 280, a storage controller 300, at least one nonvolatile memory device 400*a* and a volatile memory device 500.

In FIG. 6, the nonvolatile memory device 400*a* among the plurality of nonvolatile memory devices 400*a*~400*k* in FIG. 1 is illustrated for convenience of explanation and descriptions repeated with FIG. 1 will be omitted.

The PLP IC 220 may generate a charging voltage GCV based on an external power supply voltage EVC and may provide the PMIC 280 with one of the internal power supply voltage IVC or the external power supply voltage EVC as the output voltage VOUT.

The auxiliary power supply 250 may be charged based on the charging voltage CGV, may generate the internal power supply voltage IVC and may provide the internal power supply voltage IVC to the PLP IC 220.

The storage controller 300 may enter the storage device 200 into an idle state when the storage controller 300 does not receive a new request from the host 100 during a first time interval after the storage controller 300 completes an operation based on a request REQ (e.g., a first request) received from the host 100 and may notify the PLP IC 220 of the storage device 200 entering into the idle state by using a power control signal PCTL. When the storage controller 300 receives a new request from the host 100 during the first time interval after the storage controller 300 completes an operation based on the request REQ (e.g., a first request) received from the host 100, the storage controller 300 may enter the storage device 200 into a normal state and may notify the PLP IC 220 of the storage device 200 entering into the idle state by using the power control signal PCTL.

The PLP IC 220, based on the power control signal PCTL, may provide the external power supply voltage EVC as the output voltage VOUT in the normal state and may provide the internal power supply voltage IVC as the output voltage VOUT in the idle state.

Therefore, the PMIC 280 generates the first operating voltage VOP1, the second operating voltage VOP2 and the third operating voltage VOP3 based on the external power supply voltage EVC in the normal state and generates the first operating voltage VOP1, the second operating voltage VOP2 and the third operating voltage VOP3 based on the internal power supply voltage IVC in the idle state, and thus the volatile memory device 500 may perform a self-refresh operation on the memory cells by using the internal power supply voltage IVC in the idle state.

Figure 7:
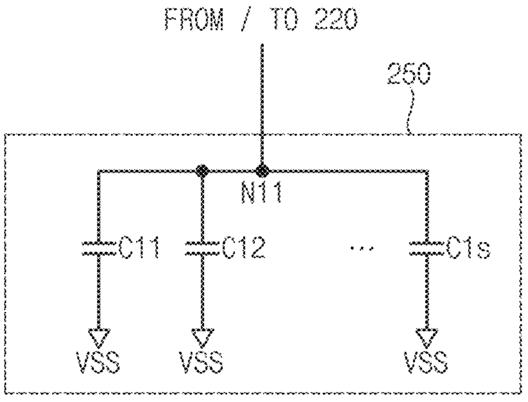
FIG. 7 illustrates an example of the auxiliary power supply in the storage device of FIG. 6 according to some example embodiments.

FIG. 7 illustrates an example of the auxiliary power supply in the storage device of FIG. 6 according to some example embodiments.

Referring to FIG. 7, the auxiliary power supply 250 may include a plurality of capacitors C111, C12, . . . , C1*s* connected in parallel between a first node N11 and a ground voltage VSS. Here, s may be an integer greater than two. Each of the plurality of capacitors C111, C12, . . . , C1*s* may include or may be referred to as a PLP capacitor.

In the normal state, the plurality of capacitors C111, C12, . . . , C1*s* may be charged based on the charging voltage GCV and in the idle state, a voltage charged in the plurality of capacitors C11, C12, . . . , C1*s* may be provided as the internal power supply voltage IVC. The first node N11 may be coupled to the PLP IC 220.

Figure 8:
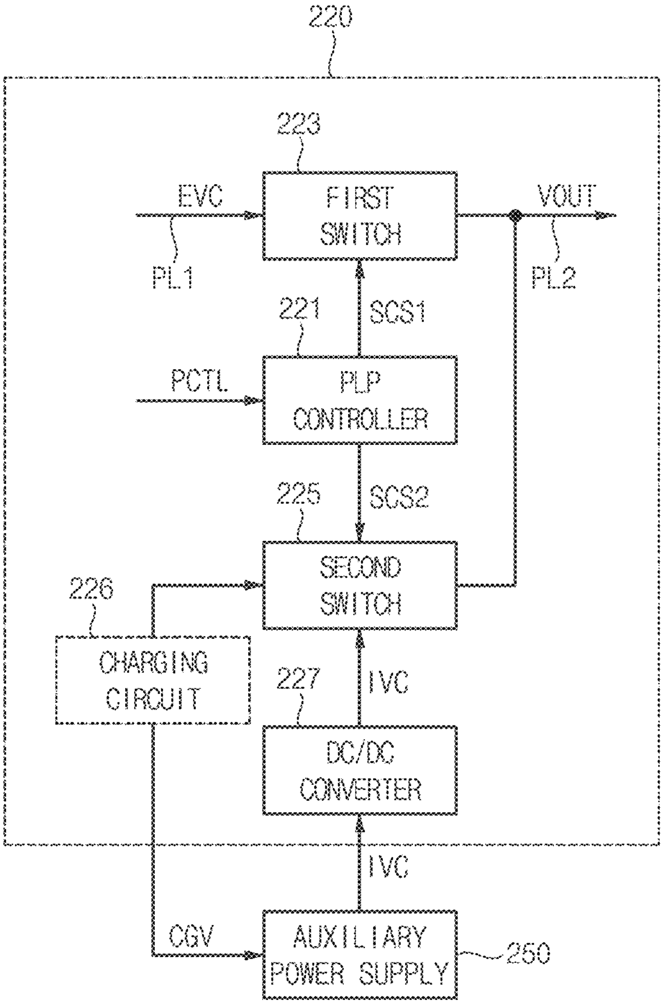
FIG. 8 is a block diagram illustrating an example of the PLP IC in the storage device in FIG. 6 according to some example embodiments.

FIG. 8 is a block diagram illustrating an example of the PLP IC in the storage device in FIG. 6 according to some example embodiments.

In FIG. 8, the auxiliary power supply 250 is also illustrated for convenience of explanation.

Referring to FIG. 8, the PLP IC 220 may include a PLP controller 221, a first switch 223, a second switch 225, and a direct current (DC)/DC converter 227. In some example embodiments, the PLP IC 220 may include a charging circuit 226.

The first switch 223 may receive the external power supply voltage EVC through a first power line PL1 and may selectively provide the external power supply voltage EVC as the output voltage VOUT through a second power line PL2 in the normal state.

The second switch 225 may be connected to the second power line PL2, may provide the auxiliary power supply 250 with the external power supply voltage EVC which is provided as the output voltage VOUT, as the charging voltage CGV and may selectively provide the internal power supply voltage IVC generated by the auxiliary power supply 250 as the output voltage VOUT to the PMIC 280 in FIG. 6.

The PLP controller 221 may control the first switch 223 and the second switch 225 based on the power control signal PCTL from the storage controller 300. The PLP controller 221 may generate a first switching control signal SCS1 and a second switching control signal SCS2 based on the power control signal PCTL, may control the first switch 223 by applying the first switching control signal SCS1 to the first switch 223 and may control the second switch 225 by applying the second switching control signal SCS2 to the second switch 225.

The DC/DC converter 227 may be connected between the second switch 225 and the auxiliary power supply 250, may convert the internal power supply IVC to have a regular voltage level and may provide the internal power supply IVC having a regular voltage level to the second switch 225. In some example embodiments, the DC/DC converter 227 may not be included in the PLP IC 220. In example embodiments, the regular voltage level may be a determined or desired voltage level that is maintained within a determined or desired voltage band, e.g., within 10% of a determined or desired voltage.

The charging circuit 226, in the normal mode, may charge the a plurality of capacitors C11, C12, . . . , C1*s* in the auxiliary power supply 250 by providing the auxiliary power supply 250 with the external power supply voltage EVC which is provided as the output voltage VOUT. In some example embodiments, the charging circuit 226 may not be included in the PLP IC 220.

In response to the power control signal PCTL designating the normal state, the PLP controller 221 may turn-on the first switch 223 by applying the first switching control signal SCS1 to the first switch 223 such that the external power supply voltage EVC is provided as the output voltage VOUT, and may connect the second power line PL2 with the charging circuit 226 through the second switch 225 by applying the second switching control signal SCS2 to the second switch 225 such that a portion of the output voltage VOUT is provided to the auxiliary power supply 250 as the charging voltage CGV.

In response to the power control signal PCTL designating the idle state, the PLP controller 221 may turn-off the first switch 223 by applying the first switching control signal SCS1 to the first switch 223, and may connect the second power line PL2 with the auxiliary power supply 250 or the DC/DC converter 227 through the second switch 225 by applying the second switching control signal SCS2 to the second switch 225 such that the internal power supply voltage IVC generated by the auxiliary power supply 250 is provided as the output voltage VOUT.

When the SPO situation occurs, the PLP controller 221 may turn-off the first switch 223 by applying the first switching control signal SCS1 to the first switch 223, and may connect the second power line PL2 with the auxiliary power supply 250 or the DC/DC converter 227 through the second switch 225 by applying the second switching control signal SCS2 to the second switch 225 such that the internal power supply voltage IVC generated by the auxiliary power supply 250 is provided as the output voltage VOUT.

In some example embodiments, the auxiliary power supply 250 may be included in the PLP IC 220.

Figure 9:
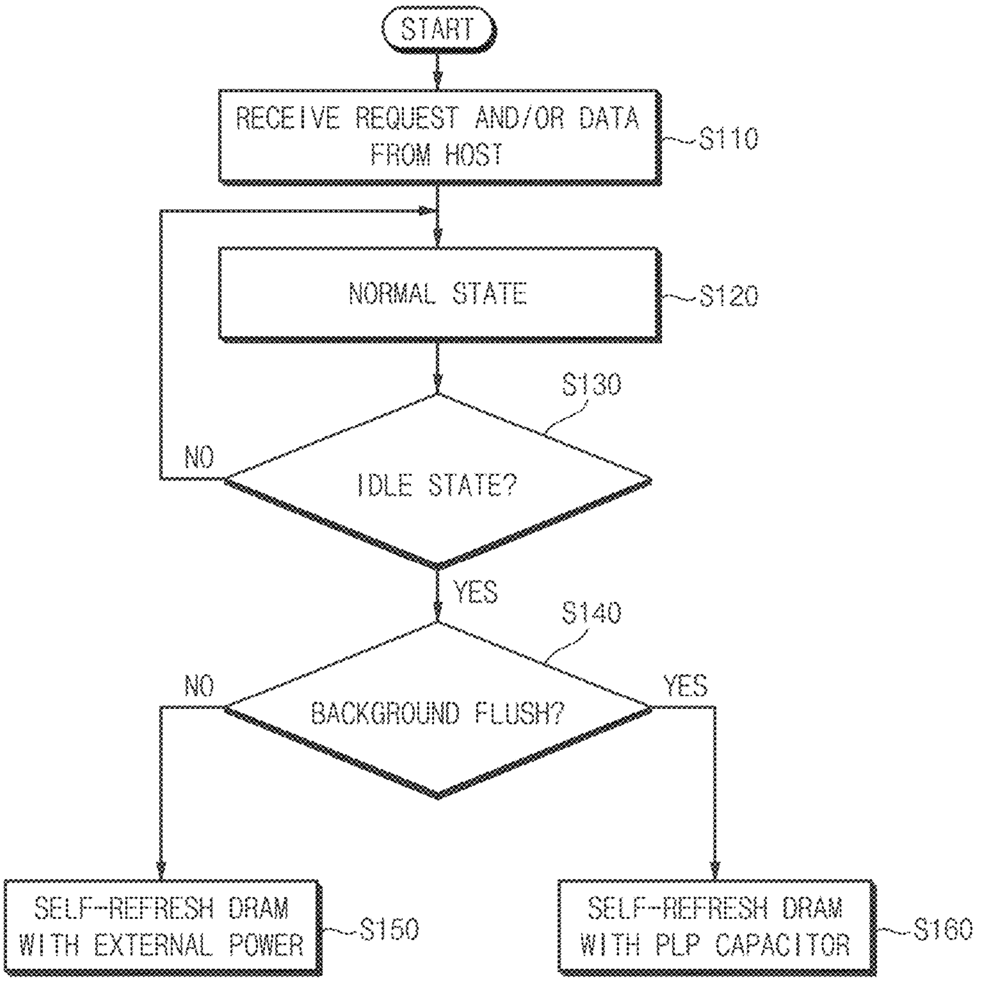
FIG. 9 is a flow chart illustrating a method of operating a storage device according to some example embodiments.

FIG. 9 is a flow chart illustrating a method of operating a storage device according to some example embodiments.

Referring to FIGS. 1 through 9, the storage controller 300 in the storage device 200 receives a request REQ and/or data DTA from the host (operation S110) and enters the storage device 200 into a normal state (operation S120). The storage controller 300 determines whether the storage device 200 enters into an idle state (operation S130) based on whether the storage controller 300 receives a new request from the host 100 during a first time interval after the storage controller 300 completes an operation based on a first request received from the host 100.

When the storage controller 300 receives a new request from the host 100 during the first time interval after the storage controller 300 completes an operation based on the first request received from the host 100 (No in operation S130), the storage controller 300 enters the storage device 200 into an normal state (e.g., an active state). When the storage controller 300 does not receive a new request from the host 100 during the first time interval after the storage controller 300 completes an operation based on the first request received from the host 100, the storage controller 300 enters the storage device 200 into an idle state (Yes in operation S130) and determines whether to perform a background flush operation (operation S140). The background flush operation corresponds to an operation to move a first data temporarily stored in the volatile memory device 500 to the nonvolatile memory device 400*a*.

When the storage controller 300 determines not to perform the background flush operation (No in operation S140), the PLP IC 220 performs a self-refresh operation on the memory cells using the external power supply voltage EVC (operation S150). When the storage controller 300 determines to perform the background flush operation (Yes in operation S140), the storage controller 300 background flush operation to move the first data temporarily stored in the volatile memory device 500 to the nonvolatile memory device 400*a* and notifies the volatile memory device 500 of completion of the background flush operation by using the power control signal PCTL.

The PLP IC 220 provides the internal power supply voltage IVC to the volatile memory device 500 based on the notification and the volatile memory device 500 performs the self-refresh operation using the internal power supply voltage IVC based on the notification (operation S160).

Figure 10:
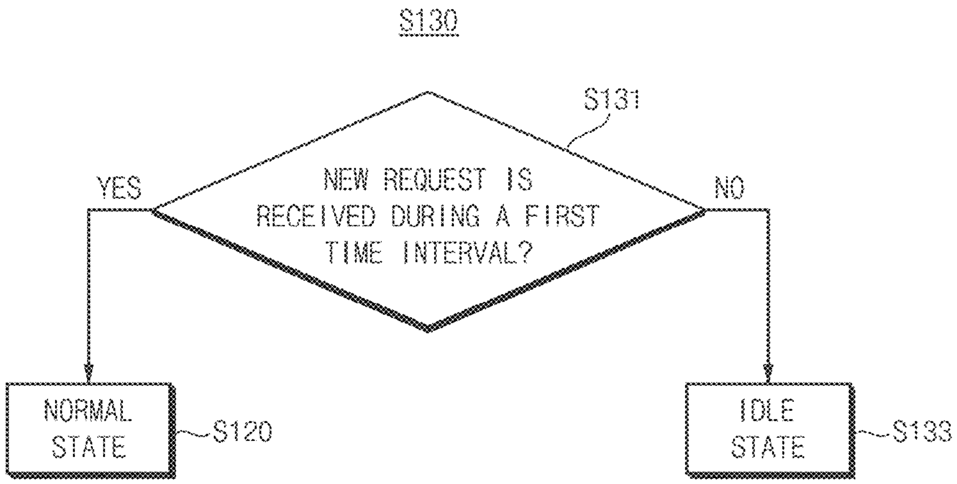
FIG. 10 is a flow chart illustrating an operation of determining whether to enter the storage device into an idle state in the method of FIG. 9 according to some example embodiments.

FIG. 10 is a flow chart illustrating an operation of determining whether to enter the storage device into an idle state in the method of FIG. 9 according to some example embodiments.

Referring to FIGS. 1 to 10, for determining whether to enter the storage device into the idle state (operation S130), the storage controller 300 determines whether to receive a new request from the host 100 during the first time interval after the storage controller 300 completes an operation based on the first request received from the host 100 (operation S131).

When the storage controller 300 receives the new request from the host 100 during the first time interval (Yes in S131), the storage controller 300 enters the storage device 200 into the normal state (operation S120). When the storage controller 300 does not receive the new request from the host 100 during the first time interval (No in S131), the storage controller 300 enters the storage device 200 into the idle state (operation S133).

Figure 11:
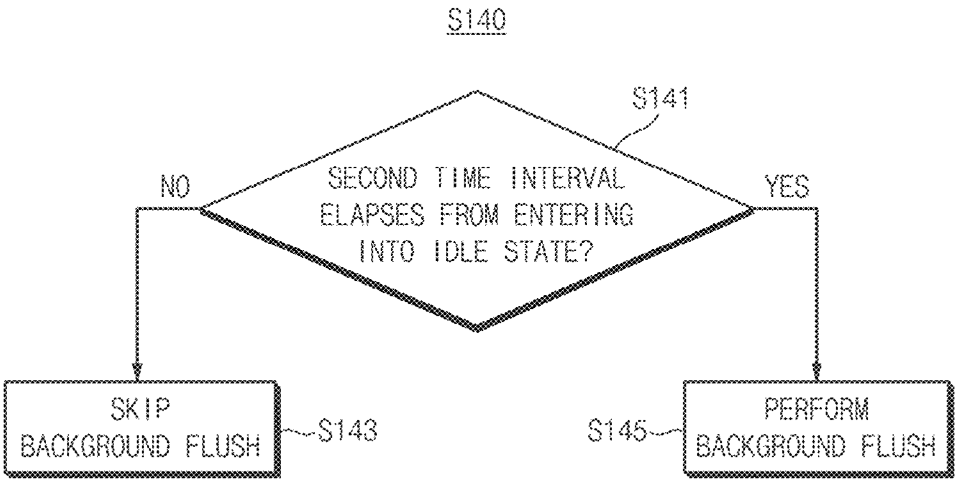
FIG. 11 is a flow chart illustrating an operation of determining whether to perform the background flush operation in the method of FIG. 9 according to some example embodiments.

FIG. 11 is a flow chart illustrating an operation of determining whether to perform the background flush operation in the method of FIG. 9 according to some example embodiments.

Referring to FIGS. 1 to 11, for determining whether to perform the background flush operation (operation S140), the storage controller 300 determines whether a second time interval elapses from a time point when the storage device entered into the idle state (operation S141).

When the second time interval does not elapse from the time point when the storage device entered into the idle state (No in S141), the storage controller 300 skips the background flush operation (operation S143). When the second time interval elapses from the time point when the storage device entered into the idle state (Yes in S141), the storage controller 300 performs the background flush operation (operation S145).

Figure 12:
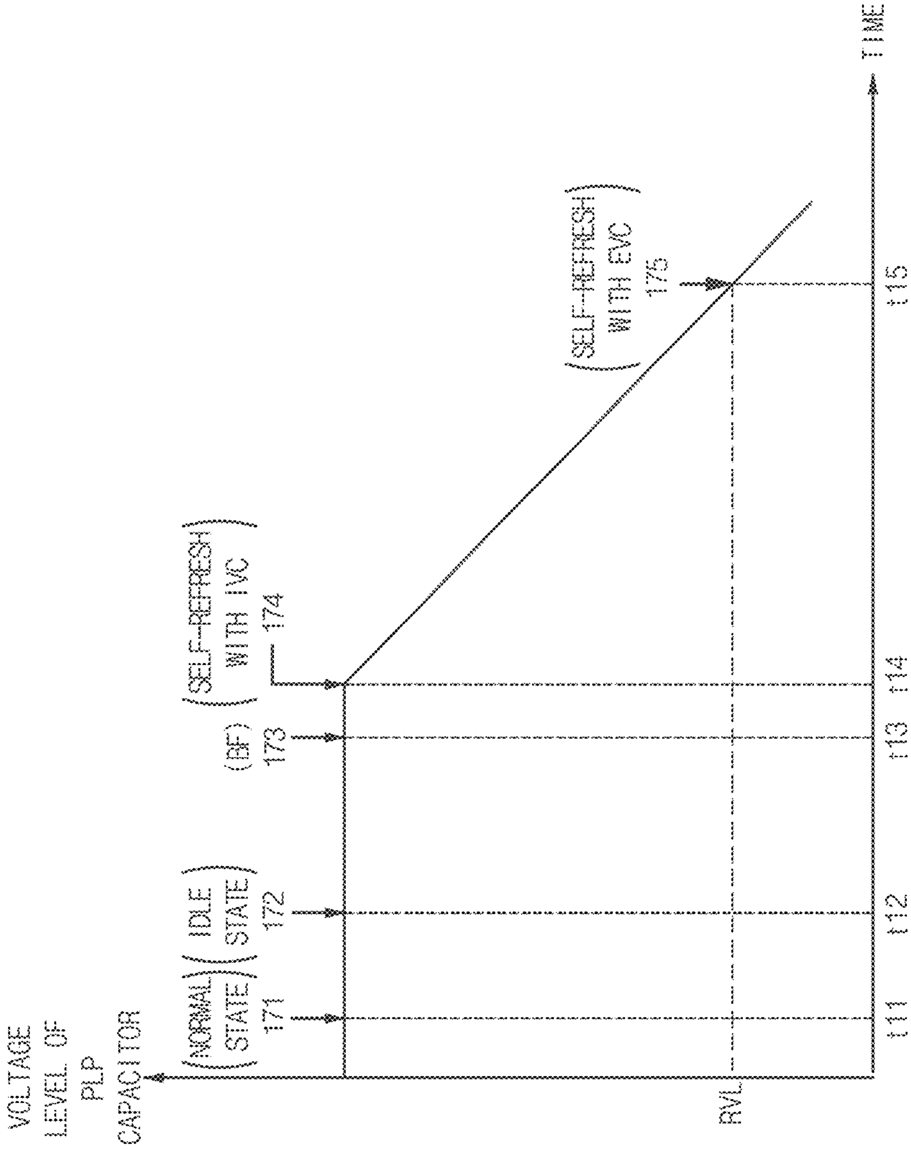
FIG. 12 illustrates a voltage level of the auxiliary power supply (e.g., PLP capacitors) according to some example embodiments.

FIG. 12 illustrates a voltage level of the auxiliary power supply (e.g., PLP capacitors) according to some example embodiments.

Referring to FIGS. 6 through 8 and 12, at a time point t11, the storage device 200 is in the normal state and the volatile memory device 500 self-refreshes the memory cells using the external power supply voltage EVC as a reference numeral 171 indicates. At a time point t12, the storage device 200 enters into the idle state as a reference numeral 172 indicates, at a time point t13, the storage controller 300 performs the background flush operation as a reference numeral 173 indicates, and at a time point t14, the volatile memory device 500 self-refreshes the memory cells using the internal power supply voltage IVC as a reference numeral 174 indicates after the background flush operation is completed. Therefore, from the time point t14, a voltage level of the voltage charged in the auxiliary power supply 250 decreases. When the voltage level of the voltage charged in the auxiliary power supply 250 decreases to a reference voltage level RVL, the PLP IC 220 provides the external power supply voltage EVC to the volatile memory device 500 as a reference numeral 175 indicates at a time point t15 and the volatile memory device 500 self-refreshes the memory cells using the external power supply voltage EVC.

Therefore, in the storage device according to some example embodiments, the volatile memory device self-refreshes the memory cells using the voltage charged in the auxiliary power supply in the idle state, and thus, the storage device may reduce power consumption in the idle state. For example, according to some example embodiments, there may be an increase in reliability, operating parameters (e.g., temperature), speed, accuracy, and/or power efficiency of the storage device based on the above methods. Therefore, the improved devices and methods overcome the deficiencies of the conventional devices and methods while reducing resource consumption, and/or improving data accuracy, operating parameters, and resource allocation (e.g., latency). Further, there is an improvement in user experience in the device by providing the improved process, for example, by reducing management responsibilities.

Figure 13:
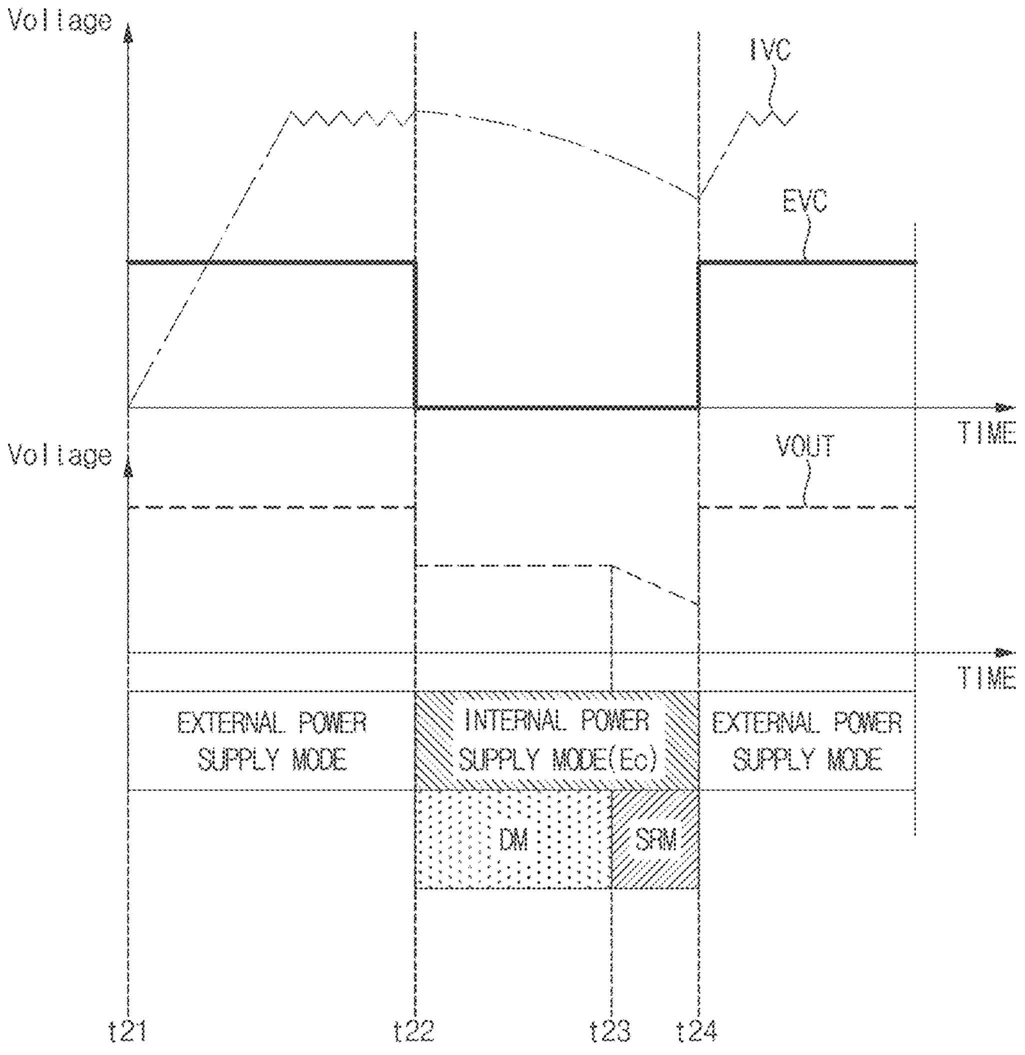
FIG. 13 illustrates an operation of a storage device according to some example embodiments.

FIG. 13 illustrates an operation of a storage device according to some example embodiments. Hereinafter, description will be given with reference to FIGS. 6 through 8.

In a section from a time point t21 to a time point t22, the external power supply voltage EVC may be normally supplied to the PLP IC 220. A voltage level the external power supply voltage EVC may be no less than the initially (or, alternatively, desired or determined) set minimum operation allowable voltage level.

Therefore, the PLP IC 220 may operate in an external power supply mode and may output the external power supply voltage EVC as the output voltage VOUT. Therefore, a voltage level of output voltage VOUT may be about the same or exactly the same as the voltage level of the external power supply voltage EVC.

When the PLP IC 220 operates in the external power supply mode, the auxiliary power supply 250 may perform the charging operation by using external power supply voltage EVC. Therefore, the voltage level of the internal power supply voltage IVC may increase from the time point t21 toward the time point t22. That is, toward the time point t22, the auxiliary power supply 250 may be fully charged.

At the time point t22, the external power supply voltage EVC may be abnormally supplied to the PLP IC 220. That is, the voltage level of the external power supply voltage EVC may be reduced to be less than an initially (or, alternatively, desired or determined) set minimum operation allowable voltage level. In other words, at the time t22, the SPO situation may occur.

Therefore, the PLP IC 220 may operate in an internal power supply mode from the time point t22.

When the PLP IC 220 may operate in the internal power supply mode, the main system 270 may operate in a dump mode DM. In the dump mode DM, the storage controller 300 may perform the background flush operation and the voltage level of the output voltage VOUT may be maintained until a time point t23. When the background flush operation is completed, the storage controller 300 may notify the PLP IC 220 of the completion of the background flush operation, the PLP IC 220 may operate in a self-refresh mode SRM to supply the internal power supply voltage IVC to the volatile memory device 500 in response to the notification and the volatile memory device 500 may perform a self-refresh operation on the memory cells by using the internal power supply voltage IVC. Therefore, the voltage level of the output voltage VOUT may be reduced from the time point t23 till a time point t24.

At the time point t24, the external power supply voltage EVC may be restored. Therefore, the PLP IC 220 may operate in the external power supply mode again and the auxiliary power supply 25 (refer to FIG. 1) may perform the charging operation by using the external power supply voltage EVC. The voltage level of the internal power supply voltage IVC may increase again from the time point t24.

Electrical energy Ec consumed by the PLP IC 220 to operate in the internal power supply mode from the time point t22 to the time t23 may be less or equal to electrical energy charged in the auxiliary power supply 250.

Therefore, in the storage device according to some example embodiments, the volatile memory device self-refreshes the memory cells using the voltage charged in the auxiliary power supply in the idle state, and thus, the storage device may reduce power consumption in the idle state.

Figure 14:
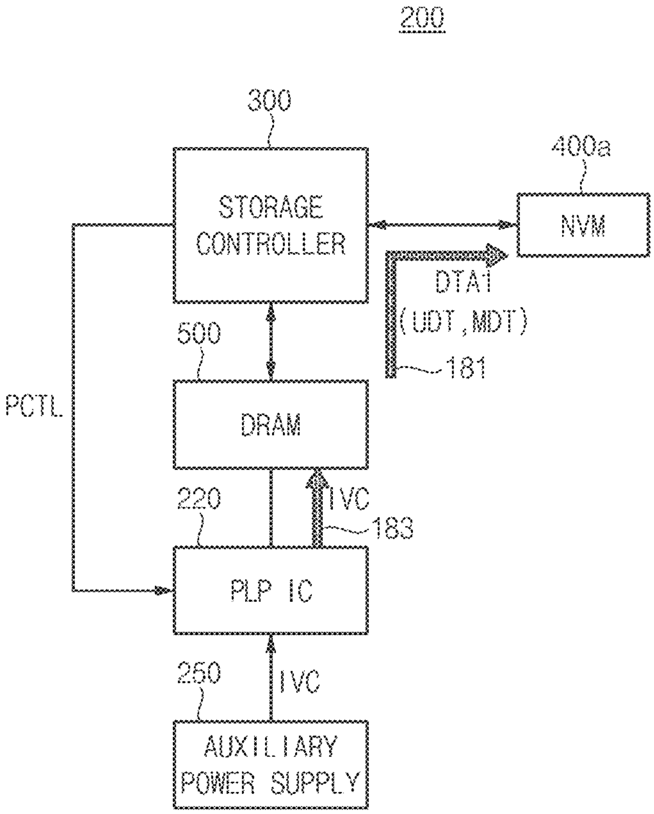
FIG. 14 illustrates an example of the background flush operation performed in the storage device according to some example embodiments.

FIG. 14 illustrates an example of the background flush operation performed in the storage device according to some example embodiments.

Referring to FIG. 14, in the idle state, the storage controller 300 performs a background flush operation to move (e.g., to dump) a first data DTA1 stored in the volatile memory device 500 to a storage region of the nonvolatile memory device 400*a* as a reference numeral 181 indicates, and applies, to the PLP IC 220, the power control signal PCTL indicating completion of the background flush operation when the background flush operation is completed. The PLP IC 220 provides the volatile memory device 500 with the internal power supply voltage IVC generated by the auxiliary power supply 250 as a reference numeral 183 indicates and the volatile memory device 500 performs the self-refresh operation on the memory cells by using the internal power supply voltage IVC.

The first data DTA1 may include a user data UDT and/or a meta data MDT.

Figure 15:
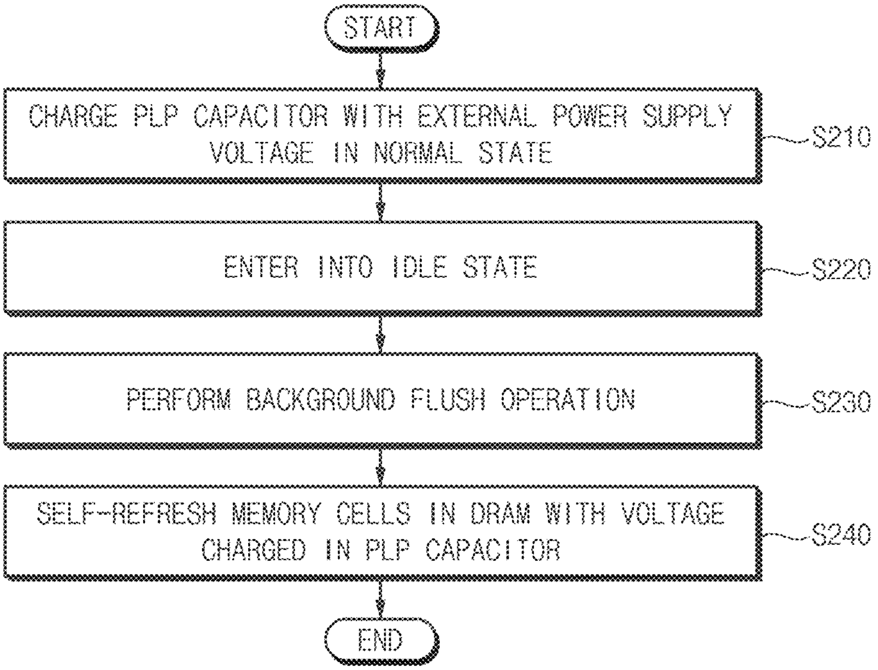
FIG. 15 is a flow chart illustrating a method of operating a storage device according to some example embodiments.

FIG. 15 is a flow chart illustrating a method of operating a storage device according to some example embodiments.

Referring to FIGS. 6 through 8 and 12 through 15, in the normal state, the PLP capacitors C11, C12, . . . , C1*s* in the auxiliary power supply 250 are charged based on the external power supply voltage EVC (operation S210). The storage controller 300 enters the storage device 200 into the idle state when the storage controller 300 does not receive a new request from the host 100 during a first time interval after the storage controller 300 completes an operation based on a first request received from the host 100 (operation S220). The storage controller 300 performs a background flush operation to move (e.g., to dump) a first data stored in the volatile memory device 500 to a storage region of the nonvolatile memory device 400*a* (operation S230).

When the background flush operation is completed, the storage controller 300 notifies the PLP IC 220 of the completion of the background flush operation by using the power control signal PCTL, the PLP IC 220 provides the volatile memory device 500 with a voltage charged in the PLP capacitors C11, C12, . . . , C1*s* and the volatile memory device 500 performs a self-refresh operation on the memory cells based on the voltage provided from the PLP IC 220 (operation S240).

Figure 16A:
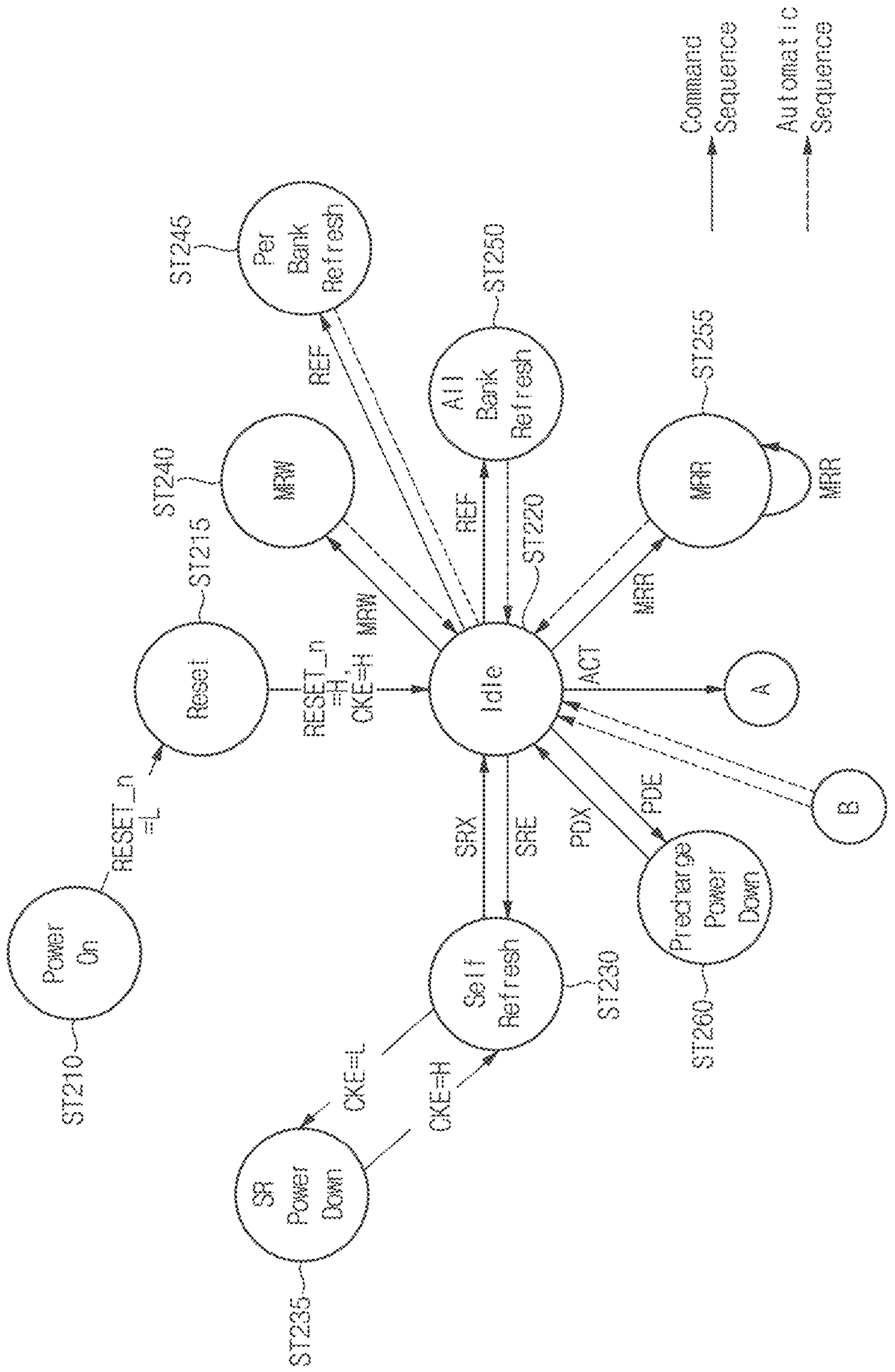
FIGS. 16A and 16B illustrate an example state diagram of a volatile memory device according to some example embodiments.
Figure 16B:
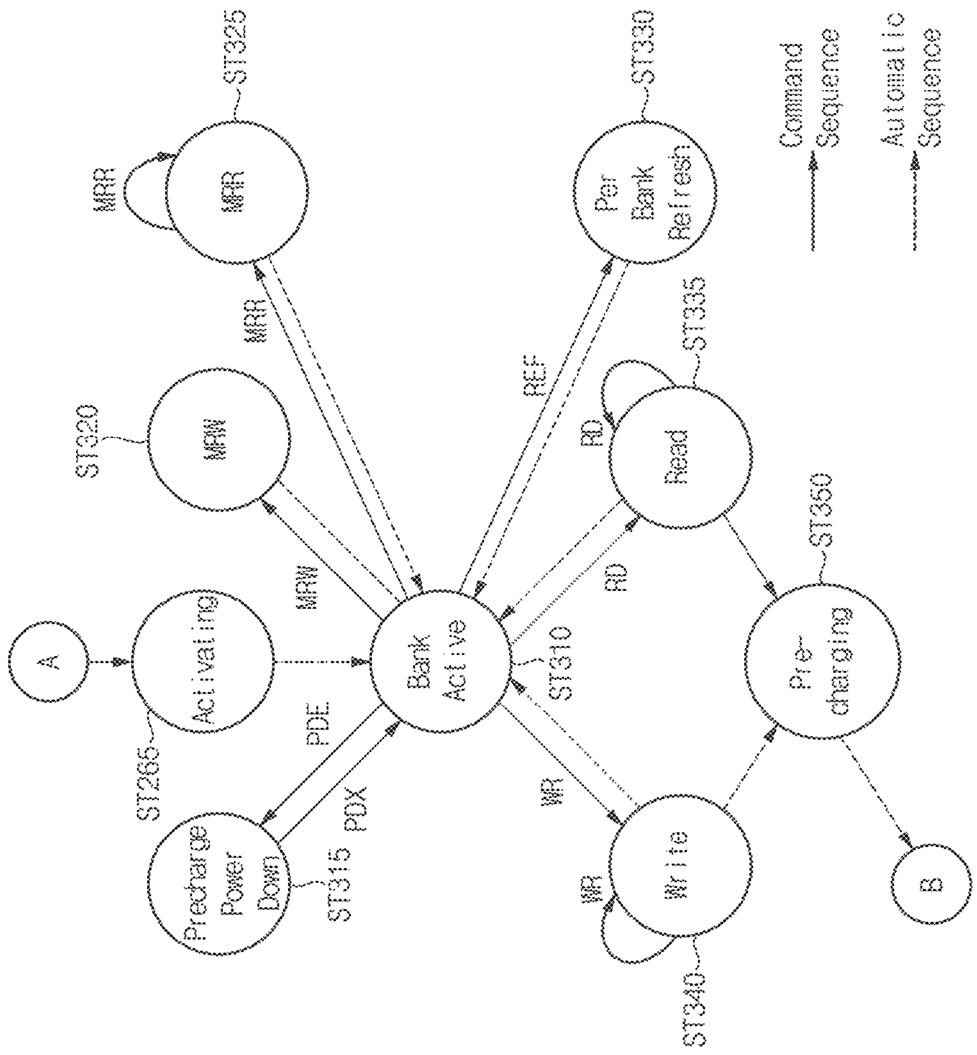

FIGS. 16A and 16B illustrate an example state diagram of a volatile memory device according to some example embodiments.

Referring to FIGS. 1, 16A, and 16B, the volatile memory device 500 may be in one of a plurality of operation mode states.

The volatile memory device 500 may enter into a power-on state ST210 when a power is applied to the volatile memory device 500 from the host 100 in FIG. 1. The power-on state ST210 may transit to a reset state ST215 in response to a reset signal RESET_n having a low level ('L'). The reset state ST215 may transit to an idle state ST220 in response to the reset signal RESET_n having a high level ('H') and a clock enable signal CKE having a high level. The idle state ST220 may define when the volatile memory device 500 does not operate, that is, when the volatile memory device 500 is not accessed.

The idle state ST220 may transit to a mode register write state ST240 in response to a mode register write command MRW. The idle state ST220 may transit to a self-refresh state ST230 in response to a self-refresh entry command SRE. The self-refresh state ST230 may transit to the idle state ST220 in response to self-refresh exit command SRX. The self-refresh state ST230 may transit to a power-down state ST235 in response to the clock enable signal CKE having a low level, and the self-refresh power-down state ST235 may transit to the self-refresh state ST230 in response to the clock enable signal CKE having a high level. The mode register write state ST 240 may automatically transit to the idle state ST220.

The idle state ST220 may transit to a per-bank refresh state ST245 or an all bank refresh state ST250 in response to a refresh command REF. The per-bank refresh state ST245 and the all bank refresh state ST250 may automatically transit to the idle state ST220.

The idle state ST220 may transit to a mode register read state ST255 in response to a mode register read command MRR. The mode register read state ST255 may automatically transit to the idle state ST220 or may be maintained at the mode register read state ST255 in response to the mode register read command MRR.

The idle state ST220 may transit to a precharge and power-down state ST260 in response to a power-down entry command PDE and the precharge and power-down state ST260 may transit to the idle state ST220 in response to a power-down exit command PDX.

The idle state ST220 may transit to a bank active state ST310 after activating a corresponding bank ST265. The bank active state ST310 may transit to an active power-down state ST315 in response to the power-down entry command PDE and the active power-down state ST315 may transit to the bank active state ST310 in response to power-down exit command PDX.

The bank active state ST310 may transit to a mode register write state ST320 in response to the mode register write command MRW. The mode register write state ST320 may automatically transit to the bank active state ST310. The bank active state ST310 may transit to a mode register read state ST325 in response to the mode register read command MRR. The mode register read state ST325 may automatically transit to the bank active state ST310 or may be maintained at the mode register read state ST325 in response to the mode register read command MRR.

The bank active state ST310 may transit to a per-bank refresh state ST330 in response to the refresh command REF. The per-bank refresh state ST330 may automatically transit to the bank active state ST310.

The bank active state ST310 may transit to a read state S335 in response to a read command RD. The read state S335 may automatically transit to the bank active state ST310, may be maintained at the read state ST335 in response to the read command RD.

The bank active state ST310 may transit to a write state S340 in response to a writ command WR. The write state S340 may automatically transit to the bank active state ST310, may be maintained at the write state S340 in response to the write command WR.

The write state S340 and the read state ST335 S340 may automatically transit to a precharging state ST350.

Figure 17:
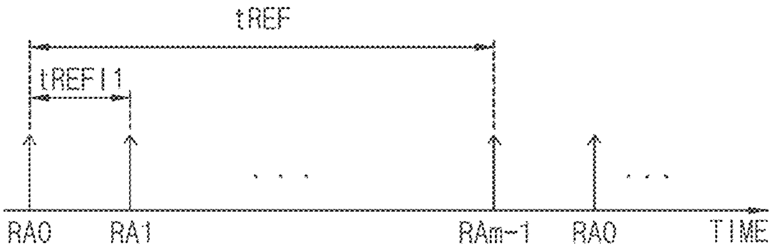
FIG. 17 illustrates that a self-refresh operation is performed in the volatile memory device of FIG. 4 according to some example embodiments.

FIG. 17 illustrates that a self-refresh operation is performed in the volatile memory device of FIG. 4 according to some example embodiments.

Referring to FIG. 17, when the volatile memory device 500 receives the self-refresh entry command, the self-refresh operation is performed on memory cell rows during a refresh period tREF. Memory cell rows corresponding to row addresses R0, RA1, . . . , RAm−1 are sequentially refreshed. One memory cell row is refreshed during a refresh interval tREFI1.

The refresh counter 545 may increase the refresh row address REF_ADDR corresponding to the row addresses R0, RA1, . . . , RAm−1 gradually under control of the control logic circuit 510 in the idle state.

Figure 18:
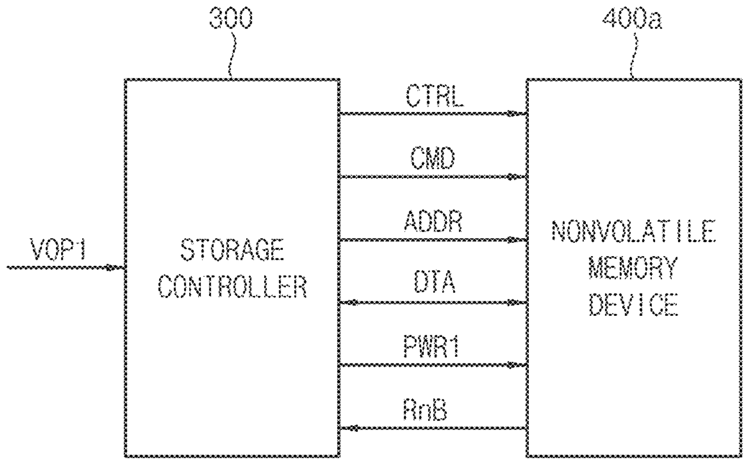
FIG. 18 is a block diagram illustrating a connection relationship between the storage controller and one nonvolatile memory device in the storage device of FIG. 1.

FIG. 18 is a block diagram illustrating a connection relationship between the storage controller and one nonvolatile memory device in the storage device of FIG. 1.

Referring to FIG. 18, the storage controller 300 may operate based on the first operating voltage VOP1.

The nonvolatile memory device 400*a* may perform an erase operation, a program operation, and/or a write operation under control of the storage controller 300. The nonvolatile memory device 400*a* may receive a command CMD, an address ADDR, and (user) data DTA through input/output lines from the storage controller 300 for performing such operations. In addition, the nonvolatile memory device 400*a* may receive a control signal CTRL through a control line and may receive a power PWR1 through a power line from the storage controller 300. In addition, the nonvolatile memory device 400*a* may provide a status signal RnB to the storage controller 300 through the control line. In addition, the nonvolatile memory device 400*a* may provide the storage controller 300 with the data DTA.

Figure 19:
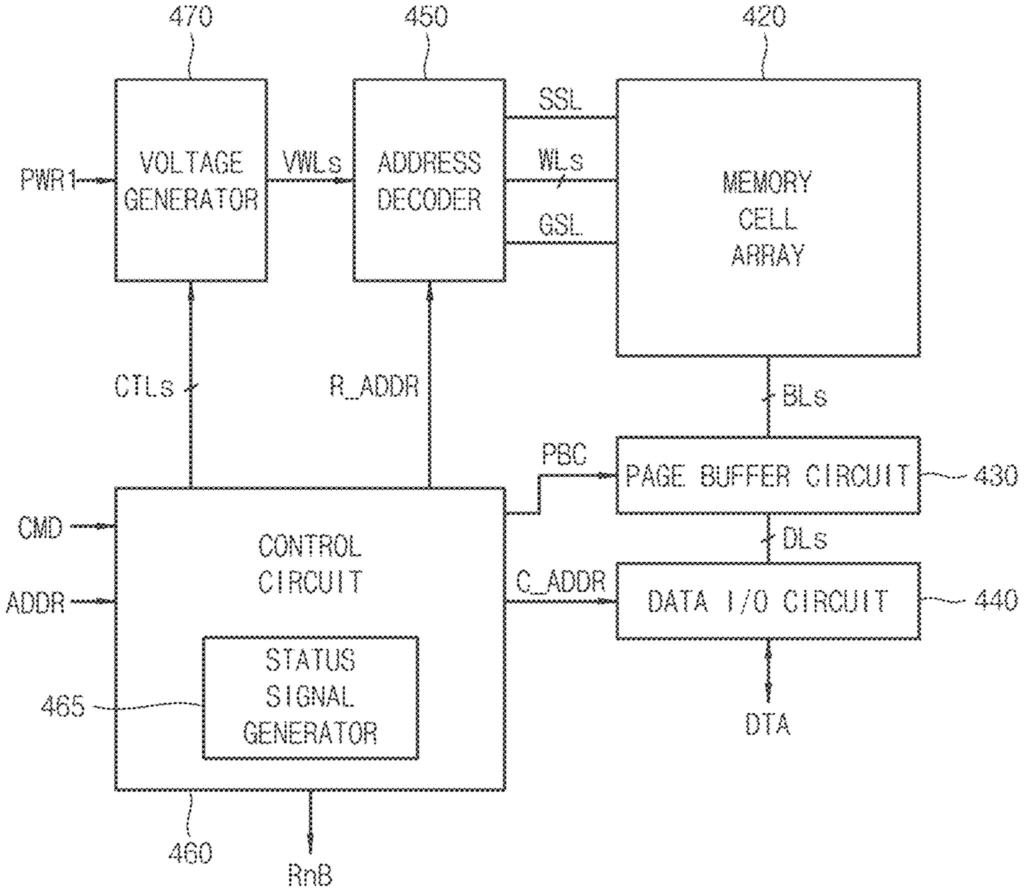
FIG. 19 is a block diagram illustrating an example of the nonvolatile memory device in FIG. 18 according to some example embodiments.

FIG. 19 is a block diagram illustrating an example of the nonvolatile memory device in FIG. 18 according to some example embodiments.

Referring to FIG. 19, the nonvolatile memory device 400*a* may include a memory cell array 420, an address decoder 450, a page buffer circuit 430, a data input/output (I/O) circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs.

The memory cell array 420 may include a plurality of memory cells coupled to the plurality of word-lines WLs and the plurality of bit-lines BLs.

In some example embodiments, the memory cell array 420 may be or include a three-dimensional memory cell array, which is formed on a substrate in a three-dimensional structure (e.g., a vertical structure). In this case, the memory cell array 420 may include (vertical) cell strings that are vertically oriented such that at least one memory cell is located over another memory cell.

Figure 20:
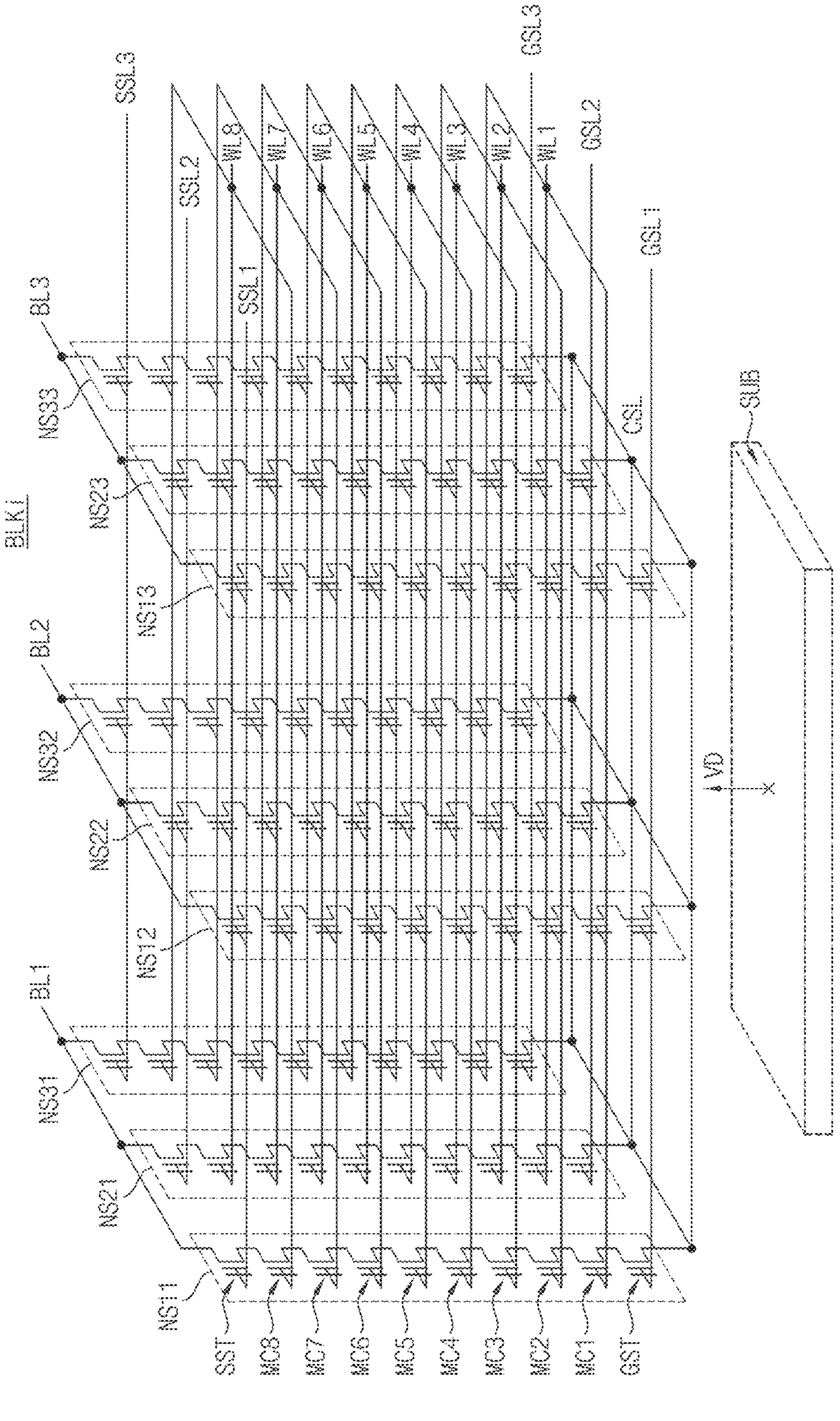
FIG. 20 is a circuit diagram illustrating one of memory blocks included in the memory cell array in FIG. 19.

FIG. 20 is a circuit diagram illustrating one of memory blocks included in the memory cell array in FIG. 19.

The memory block BLKi of FIG. 20 may be formed on a substrate SUB in a three-dimensional structure (or a vertical structure). For example, a plurality of memory cell strings included in the memory block BLKi may be formed in a vertical direction VD perpendicular to the substrate SUB.

Referring to FIG. 20, the memory block BLKi may include a plurality of cell strings NS11, NS21, NS31, NS12, NS22, NS32, NS13, NS23 and NS33 (herein, represented as NS11 to NS33) coupled between bit-lines BL1, BL2 and BL3 and a common source line CSL. Each of the memory cell strings NS11 to NS33 may include a string selection transistor SST, a plurality of memory cells MC1, MC2, MC3, MC4, MC5, MC6, MC7 and MC8 (herein, represented as MC1 to MC8), and a ground selection transistor GST. In FIG. 20, each of the memory cell strings NS11 to NS33 is illustrated to include eight memory cells MC1 to MC8. However, present disclosures are not limited thereto. In some example embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. In FIG. 20, the memory block BLKi is illustrated to be coupled to eight word-lines WL1 to WL8 and three bit-lines BL1 to BL3. However, present disclosures are not limited thereto. In some example embodiments, the memory cell array 420 may be coupled to any number of word-lines and bit-lines.

Referring back to FIG. 19, the control circuit 460 may receive the command (signal) CMD and the address (signal) ADDR from the storage controller 300, and may control an erase loop, a program loop and/or a read operation of the nonvolatile memory device 400*a* based on the command signal CMD and the address signal ADDR. The program loop may include a program operation and a program verification operation. The erase loop may include an erase operation and an erase verification operation.

For example, the control circuit 460 may generate control signals CTLs, which are used for controlling the voltage generator 470, may generate a page buffer control signal PBC for controlling the page buffer circuit 430 based on the command signal CMD, may provide the control signals CTLs to the voltage generator 470 and may provide the page buffer control signal PBC to the page buffer circuit 430. In addition, the control circuit 460 may generate a row address R_ADDR and a column address C_ADDR based on the address signal ADDR. The control circuit 460 may provide the row address R_ADDR to the address decoder 450 and may provide the column address C_ADDR to the data I/O circuit 440.

The address decoder 450 may be coupled to the memory cell array 420 through the string selection line SSL, the plurality of word-lines WLs, and the ground selection line GSL. During the program operation or the read operation, the address decoder 450 may determine one of the plurality of word-lines WLs as a first word-line (e.g., a selected word-line) and determine rest of the plurality of word-lines WLs except for the first word-line as unselected word-lines based on the row address R_ADDR.

The voltage generator 470 may generate word-line voltages VWLs, which are required for the operation of the nonvolatile memory device 400*a*, based on the control signals CTLs. The voltage generator 470 may receive the power PWR1 from the storage controller 300. The word-line voltages VWLs may be applied to the plurality of word-lines WLs through the address decoder 450.

For example, during the erase operation, the voltage generator 470 may apply an erase voltage to a well of the memory block and may apply a ground voltage to entire word-lines of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the first word-line and may apply a program pass voltage to the unselected word-lines. In addition, during the program verification operation, the voltage generator 470 may apply a program verification voltage to the first word-line and may apply a verification pass voltage to the unselected word-lines.

Furthermore, during the read operation, the voltage generator 470 may apply a read voltage to the first word-line and may apply a read pass voltage to the unselected word-lines.

The page buffer circuit 430 may be coupled to the memory cell array 420 through the plurality of bit-lines BLs. The page buffer circuit 430 may include a plurality of page buffers. In some example embodiments, one page buffer may be connected to one bit-line. In some example embodiments, one page buffer may be connected to two or more bit-lines.

The page buffer circuit 430 may temporarily store data to be programmed in a selected page or data read out from the selected page.

The data I/O circuit 440 may be coupled to the page buffer circuit 430 through data lines DLs. During the program operation, the data input/output circuit 440 may receive the data DTA from the storage controller 300 provide the data DTA to the page buffer circuit 430 based on the column address C_ADDR received from the control circuit 460.

During the read operation, the data I/O circuit 440 may provide the data DTA which are stored in the page buffer circuit 430, to the storage controller 300 based on the column address C_ADDR received from the control circuit 460.

The control circuit 460 may control the page buffer circuit 430 and data I/O circuit 440.

The control circuit 460 may include a status signal generator 465 and the status signal generator 465 may generate the status signal RnB indicating whether each of the program operation, the erase operation and the read operation is completed and/or is in progress.

The storage controller 300 may determine idle state or busy state of each of the nonvolatile memory devices 400*a*~400*k* based on the status signal RnB.

Figure 21:
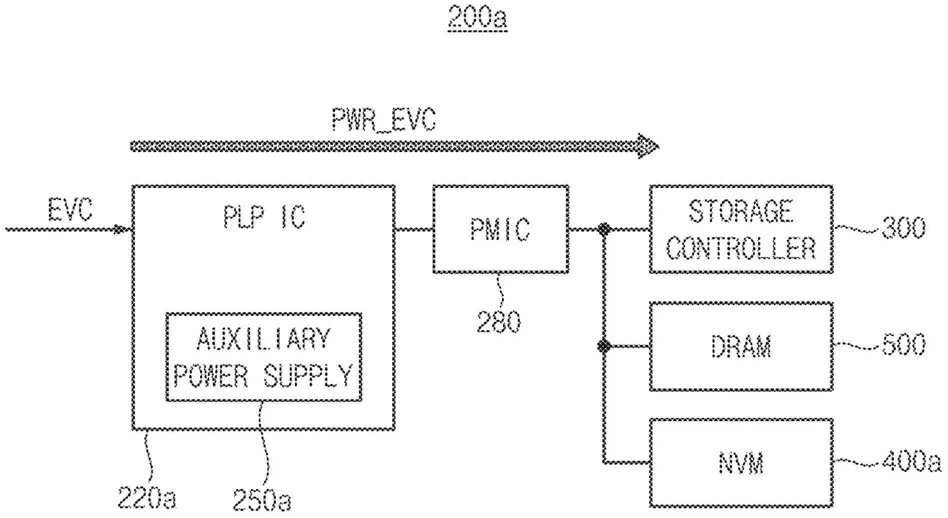
FIGS. 21 and 22 are diagrams for describing configurations and operations of a storage device according to some example embodiments.
Figure 22:
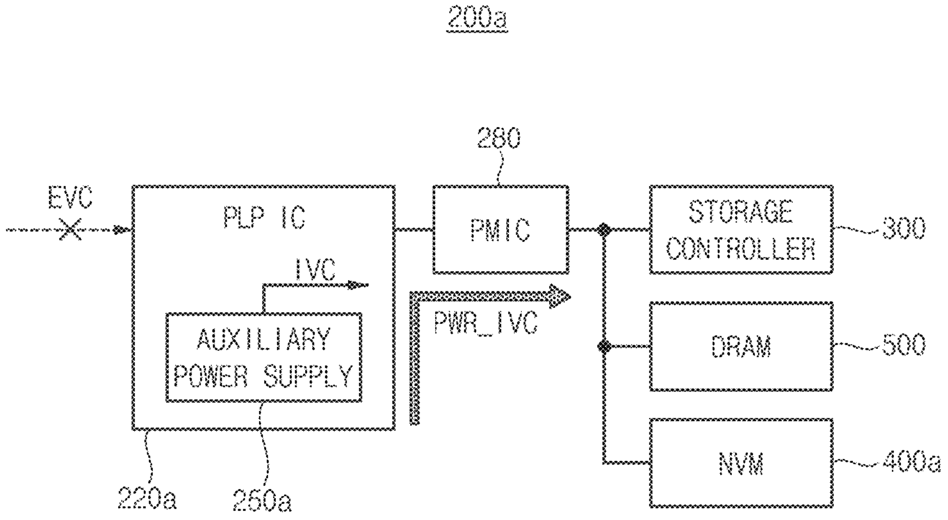

FIGS. 21 and 22 are diagrams for describing configurations and operations of a storage device according to some example embodiments.

Referring to FIGS. 21 and 22, a storage device 200*a* may include a PLP IC 220*a*, a PMIC 280, a storage controller 300, at least one nonvolatile memory device 400 and a volatile memory device 500. The PLP IC 220*a* may include an auxiliary power supply 250*a*.

Referring to FIG. 21, when the external power supply voltage EVC is normally supplied to the storage device 200*a*, power PWR_EVC that is generated based on the external power supply voltage EVC may be supplied to the storage controller 300, the at least one nonvolatile memory device 400*a* and the volatile memory device 500 through the PLP IC 220*a* and the PMIC 280. In other words, the main system 270 in FIG. 6 may operate based on the external power supply voltage EVC.

Referring to FIG. 22, in the idle state or when the external power supply voltage EVC is cut off (e.g., when SPO situation occurs), the auxiliary power supply 250*a* may generate the internal power supply voltage IVC, and power PWR_IVC that is generated based on the internal power supply voltage IVC may be supplied to the storage controller 300, the at least one nonvolatile memory device 400*a* and the volatile memory device 500 through the PLP IC 220*a* and the PMIC 280. In other words, the main system 270 in FIG. 6 may operate based on the internal power supply voltage IVC.

Figure 23:
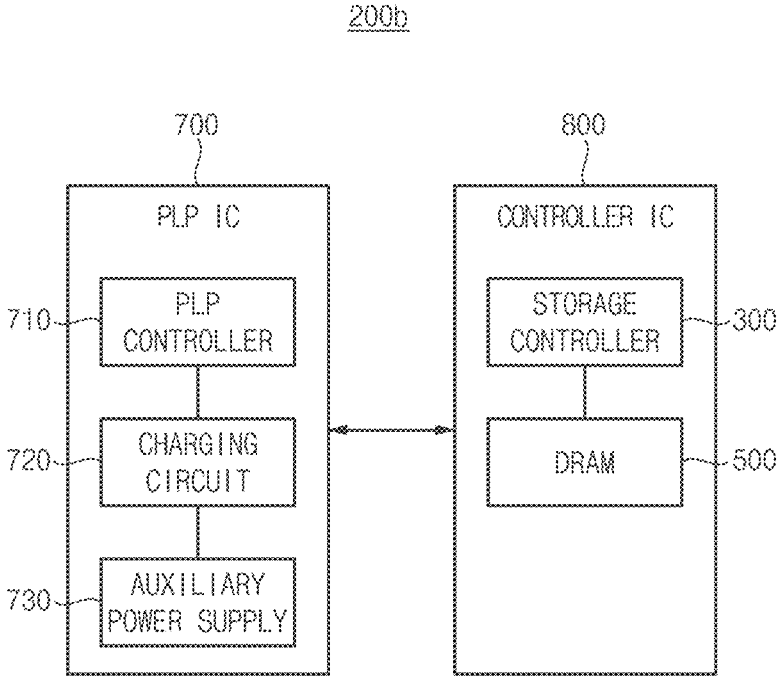
FIG. 23 is a block diagram illustrating a storage device according to some example embodiments.

FIG. 23 is a block diagram illustrating a storage device according to some example embodiments.

Referring to FIG. 23, a storage device 200*b* may include a PLP IC 700 and a controller IC 800. The PLP IC 700 may include a PLP controller 710, a charging circuit 720, and an auxiliary power supply 730. The controller IC 800 may include the storage controller 300 and the volatile memory device 500. One IC may represent an individual chip or package. In the idle state, the volatile memory device 500 may perform a self-refresh operation on memory cells included in the volatile memory device 500 by using a voltage charged in the auxiliary power supply 730.

Each of the PLP controller 710, the charging circuit 720, and the auxiliary power supply 730 may correspond to respective one of the PLP controller 221, the charging circuit 226 and the auxiliary power supply 250 in FIG. 8.

Figure 24:
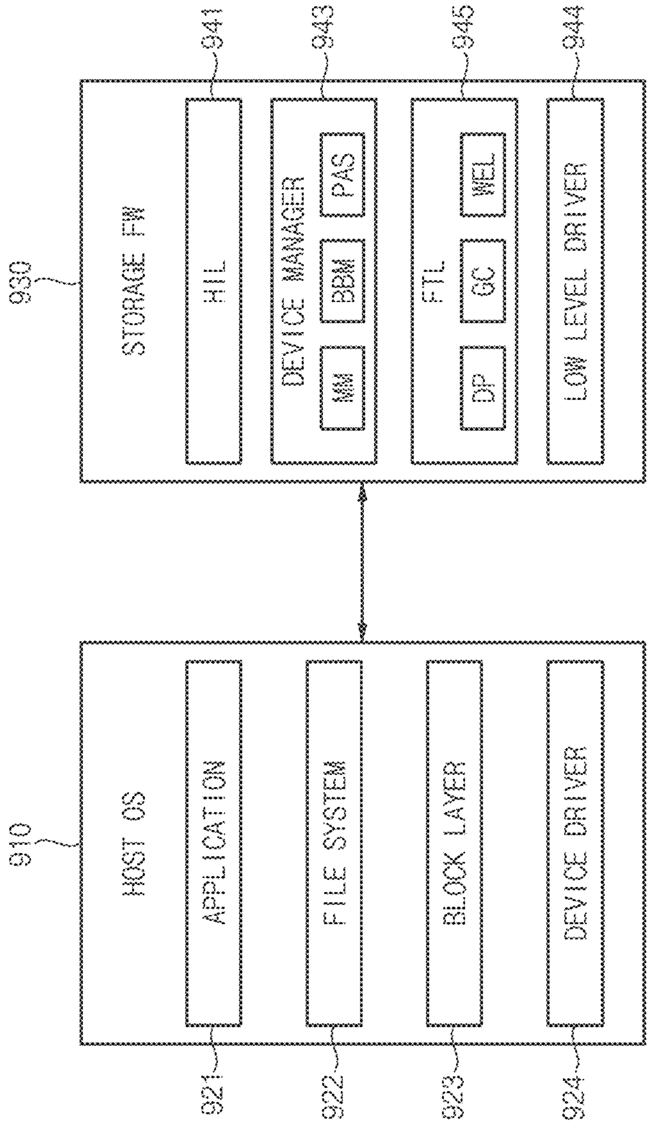
FIG. 24 is a diagram illustrating an example of a software hierarchical structure of the host and the storage device in FIG. 1 according to some example embodiments.

FIG. 24 is a diagram illustrating an example of a software hierarchical structure of the host and the storage device in FIG. 1 according to some example embodiments.

Referring to FIG. 24, an example of a software hierarchical structure of a host OS 910 executed by the host and a storage FW 930 executed by the storage device 200 is illustrated.

The host OS 910 may include an application 921, a file system 922, a block layer 923 and a device driver 924. The storage FW 830 may include a HIL 941, a device manager 943, a low level driver 944 and an FTL 945.

The application 921 may be an application software program that is executed on the host OS 910. For example, the application 921 has been programmed to aid in generating, copying, and deleting a file.

The file system 922 may manage files used by the host OS 910. For example, the file system 922 may manage file names, extensions, file attributes, file sizes, cluster information, etc. of files accessed by requests from the host OS 910 or applications executed by the host OS 910. The file system 922 may generate, delete, and manage data on a file basis.

The block layer 923 may be referred to as a block input/output (I/O) layer, and may perform data read/write operations by units of a memory block.

The device driver 924 may control the DRAM-less storage device at the OS level. The device driver 924 may be, for example, a software module of a kernel. The host OS 910 or the applications executed by the host OS 910 may request the data read/write operations via the device driver 924.

The HIL 941 may process or handle I/O requests from the host OS 910. For example, the HIL 941 may include an I/O stream manager.

The device manager 943 may perform several operations and/or functions such as a meta data management operation MM, a bad block management operation BBM, and a page access scheduling operation PAS.

The low level driver 944 may perform I/O operations with the nonvolatile memory devices 400*a*~400*k*.

The FTL 945 may perform several operations and/or functions such as a data placement operation DP (e.g., address mapping), a garbage collection operation GC, and a wear-leveling operation WEL.

Figure 25:
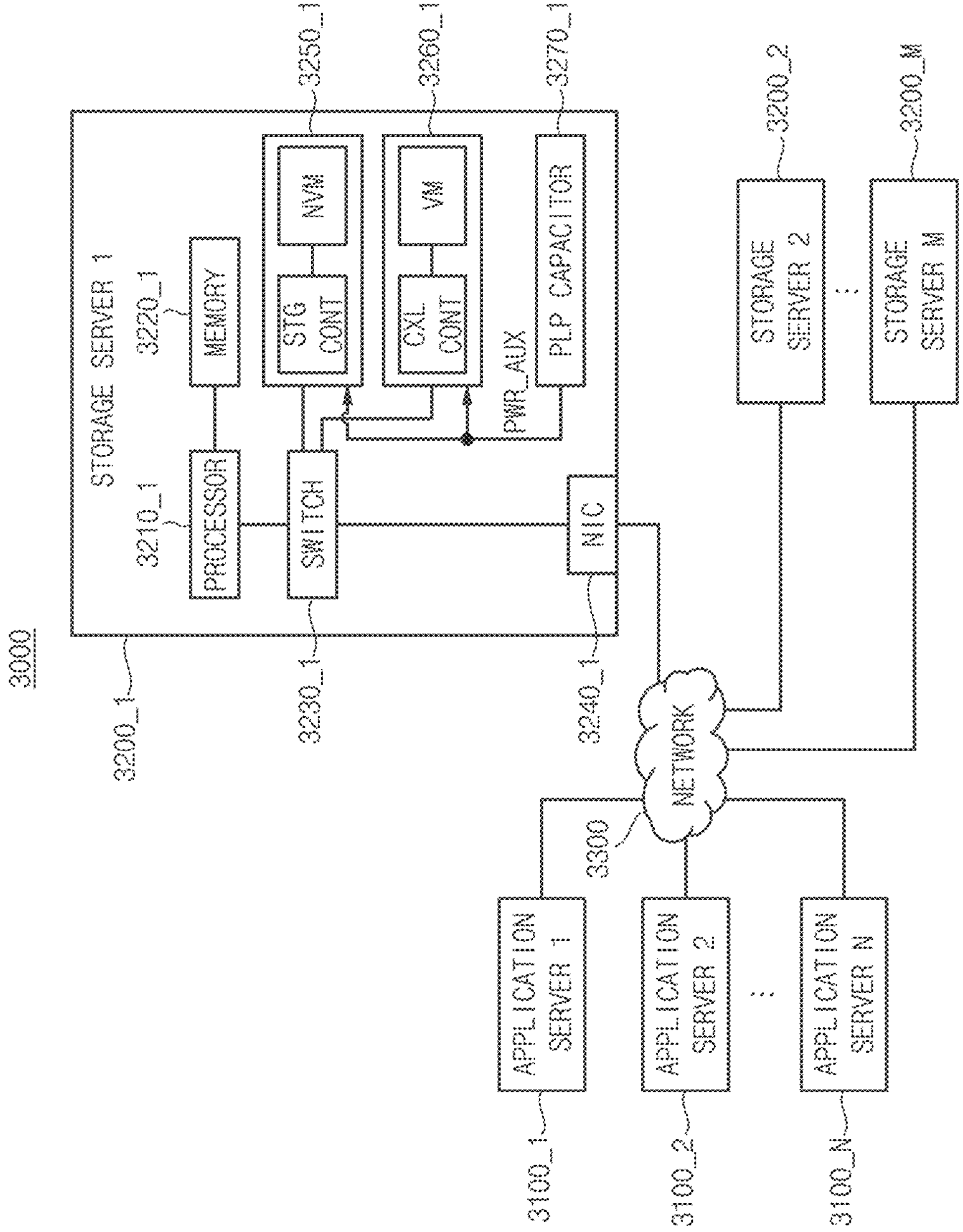
FIG. 25 is a block diagrams illustrating a data center including a storage device according to some example embodiments.

FIG. 25 is a block diagrams illustrating a data center including a storage device according to some example embodiments.

Referring to FIG. 25, a data center 3000 may be a facility that collects various types of data and provides various services and may be referred to as a data storage center or a server system. The data center 3000 may be a system for operating search engines and databases and may be a computing system used by companies such as banks or government agencies. The data center 3000 may include a plurality of application servers 3100_1, 3100_2, . . . , 3100_N, and a plurality of storage servers 3200_1, 3200_2, . . . , 3200_M, where each of N and M is a positive integer greater than or equal to three. For example, the plurality of application servers 3100_1 to 3100_N may include first to N-th application servers, and the plurality of storage servers 3200_1 to 3200_M may include first to M-th storage servers. The number of the application servers 3100_1 to 3100_N and the number of the storage servers 3200_1 to 3200_M may be variously selected according to some example embodiments, and the number of the application servers 3100_1 to 3100_N and the number of the storage servers 3200_1 to 3200_M may be different from each other.

Hereinafter, some example embodiments will be described based on the first storage server 3200_1. The application servers 3100_1 to 3100_N and the storage servers 3200_1 to 3200_M may have similar structures, and the application servers 3100_1 to 3100_N and the storage servers 3200_1 to 3200_M may communicate with each other through a network 3300.

The first storage server 3200_1 may include a first processor 3210_1, a first memory 3220_1, a first switch 3230_1, a first network interface card (NIC) 3240_1, a first storage device 3250_1, a first CXL memory expander 3260_1 and a first PLP capacitor 3270_1. The first processor 3210_1 may control overall operations of the first storage server 3200_1, and may access the first memory 3220_1 to execute instructions and/or data loaded in the first memory 3220_1. For example, the first memory 3220_1 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors and the number of the memories included in the first storage server 3200_1 may be variously selected according to some example embodiments.

In some example embodiments, the first processor 3210_1 and the first memory 3220_1 may provide a processor-memory pair. In some example embodiments, the number of the processors and the number of the memories included in the first storage server 3200_1 may be different from each other. The first processor 3210_1 may include a single core processor or a multiple core processor. The above description of the first storage server 3200_1 may be similarly applied to each of the application servers 3100_1 to 3100_N.

The first switch 3230_1 may route or relay communications between various components included in the first storage server 3200_1. The first NIC 3240_1, the first storage device 3250_1, and the first CXL memory expander 3260_1 may be connected to the first switch 3230_1. The first NIC 3240_1 may communicate with the other storage servers 3200_2 to 3200_M and/or the other application servers 3100_1 to 3100_N through the network 3300. The first storage device 3250_1 may store data. The first CXL memory expander 3260_1 may operate as a buffer memory for the first storage device 3250_1.

The first storage device 3250_1 may include a storage controller STG CONT and at least one nonvolatile memory device NVM and the first CXL memory expander 3260_1 may include a CXL controller CXL CONT and a volatile memory device VM.

The first PLP capacitor 3270_1 may generate an auxiliary power PWR_AUX by using an external power supply as a charging voltage in a normal state and may provide the auxiliary power PWR_AUX to the first storage device 3250_1 and the first CXL memory expander 3260_1 in an SPO situation or in an idle state. The volatile memory device VM in the first CXL memory expander 3260_1, in the idle state, may perform a self-refresh operation on memory cells based on the auxiliary power PWR_AUX. Therefore, a power consumption of the data center 3000 in the idle state may be reduced.

The present disclosures may be applied to various electronic devices including a storage device. For example, some example embodiments may be applied to systems such as a mobile phone, a smartphone, a personal digital assistant (PDA), a portable multimedia player (PMP), a digital camera, a server computer, a workstation, a laptop computer, a digital TV, a set-top box, a portable game console, a navigation system, a wearable device, an Internet of Things (IoT) device, an Internet of Everything (IoE) device, an e-book, a virtual reality (VR) device, an augmented reality (AR) device, a server system, an automotive driving system, etc.

Any or all of the elements described with reference to the figures may communicate with any or all other elements described with reference to figures. For example, any element may engage in one-way and/or two-way and/or broadcast communication with any or all other elements in the figures, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

The foregoing is illustrative of some example embodiments and is not to be construed as limiting thereof. Although some example embodiments have been described, those skilled in the art will readily appreciate that many modifications are possible in the example embodiments without materially departing from the present disclosure.

What is claimed is:

1. A storage device comprising:

at least one nonvolatile memory device;

a volatile memory device;

a storage controller configured to control the at least one nonvolatile memory device and the volatile memory device;

an auxiliary power supply configured to be charged based on a charging voltage and generate an internal power supply voltage; and a power loss protection (PLP) integrated circuit (IC) configured to generate the charging voltage based on an external power supply voltage and provide one of the internal power supply voltage or the external power supply voltage to the storage controller, the at least one nonvolatile memory device, and the volatile memory device as an output voltage, wherein the storage controller is configured to, enter the storage device into an idle state in response to the storage controller not receiving a new request from an external host during a first time interval after the storage controller completes an operation based on a first request received from the external host; and perform a background flush operation to move a first data temporarily stored in the volatile memory device to the at least one nonvolatile memory device in response to a second time interval elapsing from a time point the storage device entered into the idle state;

the PLP IC configured to provide the internal power supply voltage to the volatile memory device based on being in the idle state, and the volatile memory device configured to perform a self-refresh operation using the internal power supply voltage in the idle state based on the background flush operation being completed.

2. The storage device of claim 1, wherein the storage controller is configured to notify the volatile memory device of completion of the background flush operation, and the volatile memory device is configured to perform the self-refresh operation using the internal power supply voltage based on the notification.

3. The storage device of claim 2, wherein, based on being in the idle state, the PLP IC is configured to provide the internal power supply voltage to the volatile memory device until a voltage level of the internal power supply voltage is equal to or greater than a reference voltage level such that the volatile memory device performs the self-refresh operation.

4. The storage device of claim 3, wherein, based on being in the idle state, based on the voltage level of the internal power supply voltage being smaller than the reference voltage level, the PLP IC is configured to provide the external power supply voltage to the volatile memory device such that the volatile memory device performs the self-refresh operation.

5. The storage device of claim 1, wherein, based on the storage controller receiving the new request from the external host within the first time interval, the storage controller is configured to enter the storage device into a normal state.

6. The storage device of claim 5, wherein, based on being in the normal state, the PLP IC is configured to provide the external power supply voltage to the volatile memory device and the volatile memory device performs the self-refresh operation using the external power supply voltage.

7. The storage device of claim 1, wherein, in response to a sudden power-off (SPO) situation in which the external power voltage is suddenly cut off occurring, the PLP IC is configured to provide the internal power supply voltage as the output voltage, the storage controller is configured to perform the background flush operation, and the volatile memory device is configured to perform the self-refresh operation using the internal power supply voltage based on the background flush operation being completed.

8. The storage device of claim 7, wherein, the storage controller is configured to notify the volatile memory device of completion of the background flush operation, and wherein the volatile memory device is configured to perform the self-refresh operation using the internal power supply voltage based on the notification.

9. The storage device of claim 1, wherein the PLP IC includes:

a first switch configured to receive the external power supply voltage through a first power line and selectively provide the external power supply voltage as the output voltage through a second power line;

a second switch, connected to the second power line, configured to provide the external power supply voltage as the charging voltage and selectively provide the internal power supply voltage as the output voltage; and a PLP controller configured to control the first switch and the second switch based on a power control signal from the storage controller.

10. The storage device of claim 9, wherein, based on the storage controller receiving the new request from the external host within the first time interval, the storage controller is configured to enter the storage device into a normal state, based on being in the normal state, the PLP controller is configured to:

provide the external power supply voltage as the output voltage by turning-on the first switch;

provide a portion of the output voltage to the auxiliary power supply as the charging voltage by controlling the second switch.

11. The storage device of claim 9, wherein, based on being in the normal state, the PLP controller is configured to:

turn-off the first switch;

provide the internal power supply voltage generated by the auxiliary power supply as the output voltage by controlling the second switch.

12. The storage device of claim 9, wherein the PLP IC further includes:

a direct current converter, connected between the second switch and the auxiliary power supply, configured to convert the internal power supply to have a regular voltage level.

13. The storage device of claim 1, wherein the auxiliary power supply includes a plurality of capacitors connected in parallel with respect to each other.

14. The storage device of claim 13, wherein each of the plurality of capacitors includes a PLP capacitor.

15. The storage device of claim 11, wherein the auxiliary power supply is included in the PLP IC.

16. The storage device of claim 1, further comprising a power management integrated circuit (PMIC), wherein the PMIC is configured to:

generate a first operating voltage, a second operating voltage, and a third operating voltage based on the output voltage;

provide the first operating voltage to the storage controller;

provide the second operating voltage to the at least one nonvolatile memory device; and provide the third operating voltage to the volatile memory device.

17. The storage device of claim 1, wherein the storage controller includes:

a central processing unit configured to control an operation of the storage controller and an operation of the PLP IC;

a memory controller configured to perform access operation on the volatile memory device; and a memory interface configured to perform access operation on the at least one nonvolatile memory device.

18. A data center comprising:

a plurality of application servers configured to receive a data write request and receive a data read request; and a plurality of storage servers configured to store write data corresponding to the data write request and output read data corresponding to the data read request, a first storage server among the plurality of storage servers including a storage device including at least one nonvolatile memory device and a storage controller configured to control the at least one nonvolatile memory device;

a compute express link (CXL) memory expander electrically connected to the storage device, the CXL memory expander configured to communicate through a CXL interface and operate as a buffer memory of the storage device by including a volatile memory device; and a first power loss protection (PLP) capacitor electrically connected to the storage device and the CXL memory expander and outside the storage device, the first PLP capacitor configured to supply an auxiliary power voltage to the storage device and the CXL memory expander in an idle state in which the storage device does not receive a request from an outside during a first time interval, the storage controller configured to perform a background flush operation to move a first data temporarily stored in the volatile memory device to the at least one nonvolatile memory device in response to a second time interval elapsing from a time point the storage device entered into the idle state, and based on the background flush operation being completed, the volatile memory device configured to perform a self-refresh operation using the internal power supply voltage in the idle state.

19. The data center of claim 18, wherein, in response to a sudden power-off event in which an external power voltage is suddenly interrupted occurring, the PLP capacitor is configured to provide the auxiliary power voltage to the storage device and the CXL memory expander.

20. A storage device comprising:

at least one nonvolatile memory device;

a volatile memory device;

a storage controller configured to control the at least one nonvolatile memory device and the volatile memory device;

an auxiliary power supply configured to be charged based on a charging voltage and configured to generate an internal power supply voltage; and a power loss protection (PLP) integrated circuit (IC) configured to generate the charging voltage based on an external power supply voltage and provide one of the internal power supply voltage or the external power supply voltage to the storage controller, the at least one nonvolatile memory device, and the volatile memory device as an output voltage, the storage controller configured to, enter the storage device into an idle state in response to the storage controller not receiving a new request from an external host during a first time interval after the storage controller completes an operation based on a first request received from the external host; and perform a background flush operation to move a first data temporarily stored in the volatile memory device to the at least one nonvolatile memory device in response to a second time interval elapsing from a time point the storage device entered into the idle state;

the PLP IC is configured to provide the internal power supply voltage to the volatile memory device based on being in the idle state, the PLP IC configured to provide the internal power supply voltage to the volatile memory device and the volatile memory device is configured to perform a self-refresh operation using the internal power supply voltage based on the background flush operation being completed, and the PLP IC includes a plurality of capacitors connected in parallel with respect to each other.

* * * * *